(12) United States Patent
Aguayo et al.

(10) Patent No.: US 10,652,101 B2
(45) Date of Patent: *May 12, 2020

(54) SYSTEM AND METHOD FOR MANAGING SITE-TO-SITE VPNS OF A CLOUD MANAGED NETWORK

(71) Applicant: Cisco Technology, Inc., San Jose, CA (US)

(72) Inventors: Dan Aguayo, San Francisco, CA (US); John Bicket, San Francisco, CA (US); Justin J. Delegard, San Francisco, CA (US); Clifford A. Frey, San Francisco, CA (US); James M. Roewe, San Francisco, CA (US); Robert Tristan Shanks, San Francisco, CA (US); Patrick Verkaik, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,193

(22) Filed: Apr. 8, 2019

(65) Prior Publication Data

US 2019/0238418 A1 Aug. 1, 2019

Related U.S. Application Data

(63) Continuation of application No. 14/563,977, filed on Dec. 8, 2014, now Pat. No. 10,257,042, which is a
(Continued)

(51) Int. Cl.
*H04L 12/24* (2006.01)
*H04L 12/46* (2006.01)

(52) U.S. Cl.
CPC .......... *H04L 41/12* (2013.01); *H04L 12/4633* (2013.01); *H04L 12/4675* (2013.01)

(58) Field of Classification Search
CPC .. H04L 41/12; H04L 12/4633; H04L 12/4675
See application file for complete search history.

(56) References Cited

U.S. PATENT DOCUMENTS

2001/0055303 A1 12/2001 Horton et al.
2006/0062187 A1* 3/2006 Rune ........................ H04Q 7/24
(Continued)

OTHER PUBLICATIONS

Ford, Bryan et al., Peer-to-Peer Communication Across Network Address Translators, in USENIX Annual Technical Conference, 2005, pp. 179-192, downloaded from http://www.brynosaurus.com/pub/net/p2pnat/, Jan. 10, 2012, 13 pages.
(Continued)

*Primary Examiner* — Ronald B Abelson
(74) *Attorney, Agent, or Firm* — Polsinelli PC

(57) ABSTRACT

A management server includes a configuration and management module processing server configuration information, including a VPN peer list and VLAN/subnet settings. The management server automatically calculates the VPN configuration information, including the VPN peer subnet route information identifying which of the subnets participating in the VPN are behind which of the routers and keys to establish VPN tunnels between those routers participating in the VPN. Each of the routers participating in the VPN includes a VPN tunnel with the other routers participating in the VPN, a set of data structures storing data identifying contact information for each of the subnets participating in the VPN, a combination of an IP address and port to reach one of routers that that subnet is behind, and a forwarding module to forward traffic between the subnets.

20 Claims, 16 Drawing Sheets

Related U.S. Application Data continuation of application No. 13/350,736, filed on Jan. 13, 2012, now Pat. No. 8,908,698.

(56) References Cited

U.S. PATENT DOCUMENTS

| | | |
|---|---|---|
| 2008/0080524 A1 | 4/2008 | Tsushima et al. |
| 2008/0198858 A1 | 8/2008 | Townsley et al. |
| 2011/0206052 A1 | 8/2011 | Tan et al. |
| 2012/0036234 A1* | 2/2012 | Staats .................. G06F 15/177 |
| 2012/0039334 A1* | 2/2012 | Mehta .................... H04L 12/56 |
| 2015/0092603 A1* | 4/2015 | Aguayo .................. H04L 12/24 |

OTHER PUBLICATIONS

Meraki releases industry's first cloud-managed routers, Merkai, Inc., Jan. 13, 2011, downloaded from http://meraki.com/press-releases/2011/01/13/meraki-releases-industrys-first-cloud-managed-routers/, Jan. 8, 2012, 2 pages.

Blanchet, M., A Flexible Method for Managing the Assignment of Bits of an IPv6 Address Block, The Internet Society, Network Working Group, Request for Comments: 3531, Category: Informational, Apr. 2003, 8 pages.

Baker, F. ed., Requirements for IP Version 4 Routers, The Internet Society, Network Working Group, Request for Comments: 1812, Category: Standards Track, Jun. 1995, 175 pages.

* cited by examiner

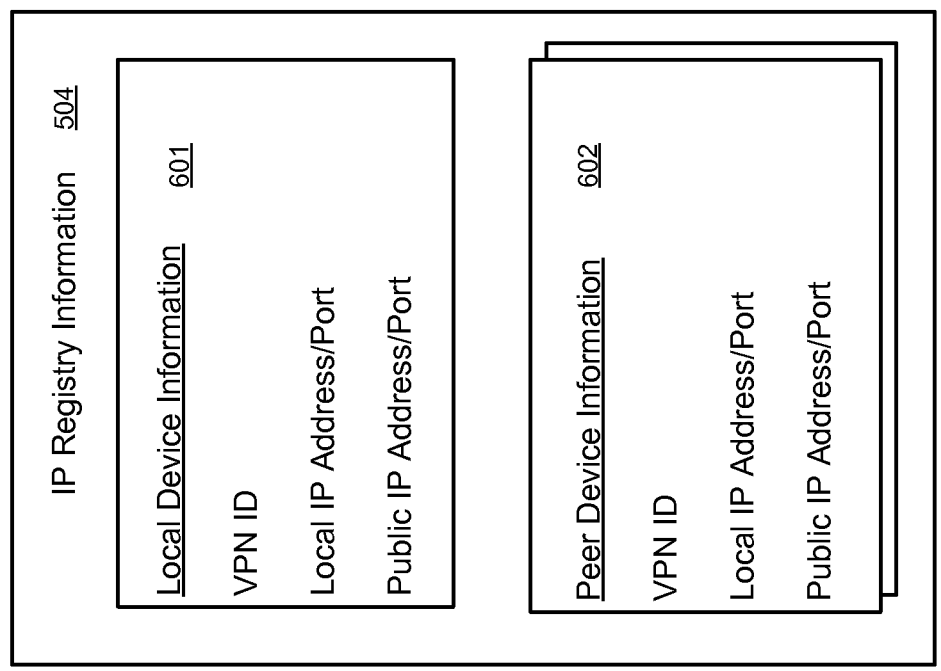

FIG. 8D

SYSTEM AND METHOD FOR MANAGING SITE-TO-SITE VPNS OF A CLOUD MANAGED NETWORK

CROSS REFERENCE TO RELATED APPLICATION

This application is a continuation of U.S. application Ser. No. 14/563,977, filed on Dec. 8, 2014, which in turn, is a continuation of U.S. patent application Ser. No. 13/350,736, filed Jan. 13, 2012, the contents of which are incorporated by reference herein in their entirety.

FIELD

Embodiments of the present invention relate generally to networking. More particularly, embodiments of the invention relate to configuring and managing virtual private networks (VPNs) of a cloud managed network.

BACKGROUND

VPN networks typically include multiple routers that use public infrastructure to communicate with each other (directly or indirectly) to create an overlay network across WAN links. The WAN can include, for example, the Internet, and the communication with the WAN is typically through a T1 interface, T3 interface, cable interface (cable modem), DSL interface or the like. VPN networks are convenient because they can be implemented with little or no effort to provide infrastructure and establish private and encrypted communication between devices that need to access each other but do not wish to be available via public infrastructure or the Internet to all other computers. VPN networks are convenient because they can be implemented with little or no private infrastructure. For example, it is generally not necessary to install additional cabling or install a wide area network. Once the connection to the WAN is provided, additional routers can be configured to communicate and thereby provide network access whose geographic coverage is theoretically limited only by the physically distribution of routers.

A virtual private network (VPN) is a network that typically uses public telecommunication infrastructure, such as the Internet, to provide remote offices or traveling users access to a central organizational network. VPNs typically require remote users of the network to be authenticated, and often secure data with encryption technologies to prevent disclosure of private information to unauthorized parties. VPNs may serve any network functionality that is found on any network, such as sharing of data and access to network resources, printers, databases, websites, etc. A VPN user typically experiences the central network in a manner that is identical to being connected directly to the central network.

A site-to-site VPN allows multiple geographically different fixed locations (sites) to establish secure connections with each other over a public network such as the Internet. A site-to-site VPN extends the company's network, making computer resources from one location available to other locations. An example of a company that needs a site-to-site VPN is a growing corporation with dozens of branch offices. A site-to-site VPN can be set up between two routers (that is, two network devices operating as routers) at the different sites that provide access to the WAN for that site (where these routers are also referred to as the VPN endpoints or VPN endpoint network devices). When multiple routers are part of the same VPN network, typically a VPN tunnel is created between each to form a mesh VPN.

Currently, to set up virtual private networks between routers, network administrator(s) for the organization has to: generate cryptographic keys to encrypt traffic; install keys on each pair of routers, which keys are used to establish the VPN tunnel between them; install remote endpoint network configuration on each router (i.e., tell each router about the others' IP addresses and ports); etc.

There are many disadvantages with the common methods of configuring mesh VPNs. A large number of error-prone manual human configuration steps are required. For instance, making configuration changes (i.e. changing a subnet) requires manual entry on multiple routers and is error prone. It is difficult to audit and keep track of the cryptographic keys used (i.e. generation and storage of these). Revocation of a device's access (i.e. removing a device from the VPN) requires manual configuration changes on every other router in the VPN. Devices cannot automatically verify and contact each other once they are configured.

BRIEF DESCRIPTION OF THE DRAWINGS

Embodiments of the invention are illustrated by way of example and not limitation in the figures of the accompanying drawings in which like references indicate similar elements.

FIG. 6A is a diagram illustrating an example of IP registry information according to one embodiment of the invention.

FIG. 6B is a diagram illustrating an example of a punch table according to one embodiment of the invention.

FIGS. 8A-8D are screenshots illustrating examples of graphical user interfaces of a management server according to certain embodiments of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A system for automatically configuring and managing VPNs without the need for significant manual configuration of each VPN endpoint network device is described. According to some embodiments, the system automates the setup and configuration of a mesh (all-pairs connected) VPN. According to some embodiments, the system automatically handles distributing correct cryptographic keys to each VPN endpoint, establishing VPN tunnels between all pairs of endpoints in the VPN, and reconfiguring all endpoints in the case of any configuration change in the system (e.g., redefinition of a subnet, addition or removal of a VPN endpoint) or in the event that an endpoint's IP address changes. According to some embodiments, the system also automatically discovers how each VPN endpoint can reach the other VPN endpoints given the configuration (e.g., whether there is network address translation (NAT) being performed by another network device between the VPN endpoint and the WAN). According to some embodiments, the system also automatically detects collision of subnets and/or automatically selects subnets that do not overlap the ones currently in use.

Figure 1:
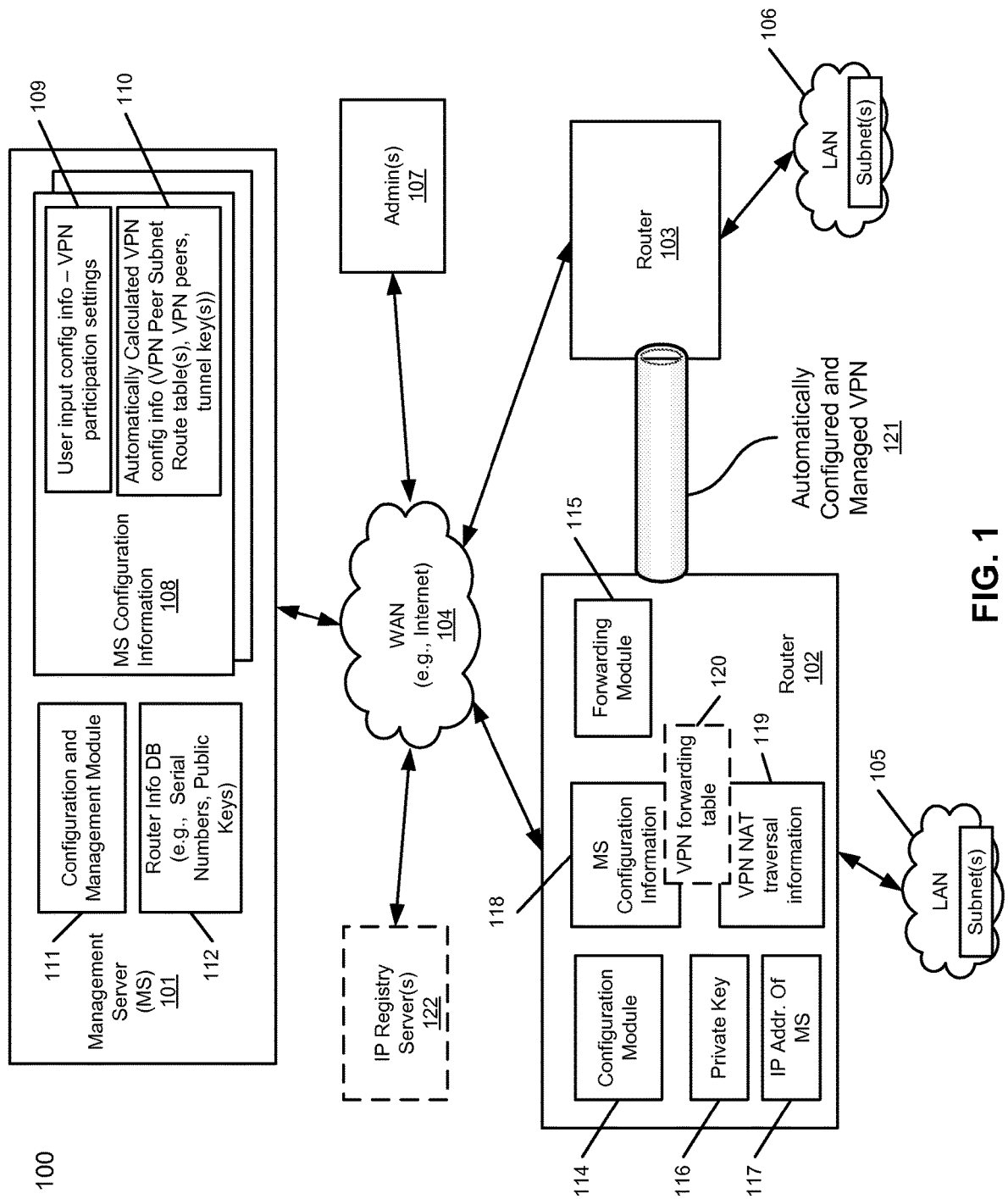
FIGS. 1-2 are block diagrams illustrating a cloud managed network configuration according to some embodiments of the invention.

FIG. 1 is a block diagram illustrating a cloud managed network system with automatic configuration and management of VPNs according to one embodiment of the invention. Referring to FIG. 1, system 100 includes, but is not limited to, various routers 102-103 (which may be wired and/or wireless) managed by a management server (MS) 101 over WAN 104. Management server 101 may be a Web or cloud server, or a cluster of servers, running on server hardware. Each of routers 102-103 is associated with a LAN such as LANs 105-106. Network 104 may be the Internet. Routers 102-103 may operate as a gateway device to LANs 105-106, respectively, where various client devices (not shown) can be coupled to LANs 105-106. In this example as shown in FIG. 1, it is assumed that routes 102-103 are owned by the same organization and administrated by a network administrator 107. Also note that for the purpose of illustration, although router 103 is not shown with details therein, however, router 103 has the same or similar architecture as router 102. For the purpose of illustration, only two routers are shown. However, it is not so limited; additional routers may be coupled to network 104 and managed by managed server 101. In one embodiment, the management server works for both single and multi-tenant installations, meaning that multiple organizations with different network administrators may have routers managed by the same management server, and VPNs can be constructed using the same management server, but that are firewalled off from each other and do not have access to each other's network configurations.

According to one embodiment, management server 101 includes a configuration and management (CM) module 111 to configure routers 102-103 and to generate MS configuration information 108 for each of routers 102-103. In one embodiment, management server 101 provides a user interface such as a Web interface to allow network administrator 107 to create and log into an account associated with the organization to which the routers 102-103 belong.

The management server 101 includes router information database 112, including information regarding the routers 102-103. In one embodiment, the router information database 112 includes a serial number and a mechanism to authenticate the router's identity (e.g., the public key of a private public key pair, the private key 116 of which was embedded or stored in the router during the manufacturing). This router information database 112 may be populated different ways in different embodiments (e.g., populated by the seller of the routers, populated by the network administrator). In embodiments in which this information is populated by the seller, different ones of these embodiments may associate the information regarding routers 102-103 in the router information database with the user account in different ways (example, the network administrator 107 may provide an order number (or invoice number) associated with a purchase of routers 102-103).

An example of the user interface provided by the management server is shown in FIGS. 8A-8D, which will be described in details further below. From the user interface, the network administrator 107 can provide user input configuration information 109 that is significantly less than the conventional system required to configure routers 102-103. In one embodiment, user input configuration information 109 includes, for each of the routers, a VPN participation setting and/or VLAN/subnet settings, etc. If there is a subnet specified by the administrator, CM module 111 is configured to detect whether the specified subnet overlaps with any subnet currently used by other devices. If there is a conflict, CM module 111 may alert the administrator. In one embodiment, this user input configuration information 109 is user configurable, meaning that default settings are applied if the user does not input such settings. For example, if there is no subnet or VLAN specified by the network administrator for a given router, CM module 111 automatically selects and assigns a subnet that does not overlap the other subnets currently used. Based on the user input configuration information 109 and information extracted from router information database 112, CM module 111 automatically calculates VPN configuration information 110.

In one embodiment, CM module 111 automatically generates VPN peer information based on the VPN participation settings, tunnel keys for each VPN peer pair, and VPN peer subnet route information, etc. The VPN peer information identifies which of the routers are configured to participate in the VPN; in the simple case, this may simply be the serial numbers of the routers, but for greater security a VPN ID may be generated for each router (e.g., such VPN IDs may be generated to be unique across all routers represented in the management sever across all organizations) (e.g., such VPN IDs may be generated by cryptographically hashing of {a private key of the management server, router serial number}). The VPN peer subnet route information identifies which of the plurality of subnets participating in the VPN are behind which routers. While in some embodiments this automatically calculated VPN configuration includes generating a VPN peer list and VPN peer subnet route table specific to each of the VPN routers (e.g., the VPN peer list identifying other routers participating in a VPN; and the VPN peer subnet route table identifying, for each the subnets that is participating in the VPN and that is behind one of the other routers, that subnet and the other router it is behind), other embodiments provide the same information to all of the VPN routers participating in the same VPN. Note that MS configuration information may be different for each of the router peers, while certain portions of the MS configuration information may be identical or similar.

According to one embodiment, when a router, in this example router 102, is powered up and attempts entering network 104, configuration module 114 attempts to contact management server 101. In one embodiment, certain device information such as an IP address 117 of management server 101 is stored in the router 102 when it is manufactured. In one embodiment, when router 102 is powered up, configuration module 114 performs any self-configuration processes including obtaining an IP address for itself from a dynamic host configuration protocol (DHCP) facility (which address may be a public IP address, or may be a private IP address if there is a device performing NAT between the router and the WAN (that is to say, the router is behind a device performing NAT)). Configuration module 114 then accesses management server 102 based on the IP address 117 and authenticates itself (e.g., signing a message (e.g., including the serial number of the router) using the private key 116 such that management server 101 can authenticate router 102 using the associated public key (stored in the router information database 112) maintained by management server 101).

In one embodiment, each of routers 102-103 creates one or more secure communication channels (e.g., a control tunnel) with server 101 using the keys downloaded from management server 101 to exchange control traffic such as management messages or notification, etc. In one embodiment, once router 102 has been successfully authenticated by server 101, configuration module 114 of router 102 downloads MS configuration information 108 and stores it in a storage device within the router 102 as part of MS configuration information 118. This download may take place over a secure session layer (SSL)-encrypted session and/or the management server may encrypt the data using the public key corresponding to the private key 116. This secure channel may also be used to receive subsequent configuration updates from the backend.

In addition, configuration module 114 obtains VPN network address translation (NAT) traversal information 119 (also referred to as IP registry information). The VPN NAT traversal information includes combinations of IP addresses/ports of certain VPN peers (in one embodiment, these may include a combination of a local IP address/port and a combination of a public IP address/port; which IP address will be the same if the router is not behind a device performing NAT). The VPN NAT traversal information may be obtained from a set of one or more IP registry servers such as IP registry server(s) 122 as described later herein, or alternatively from management server 101.

Figure 2:
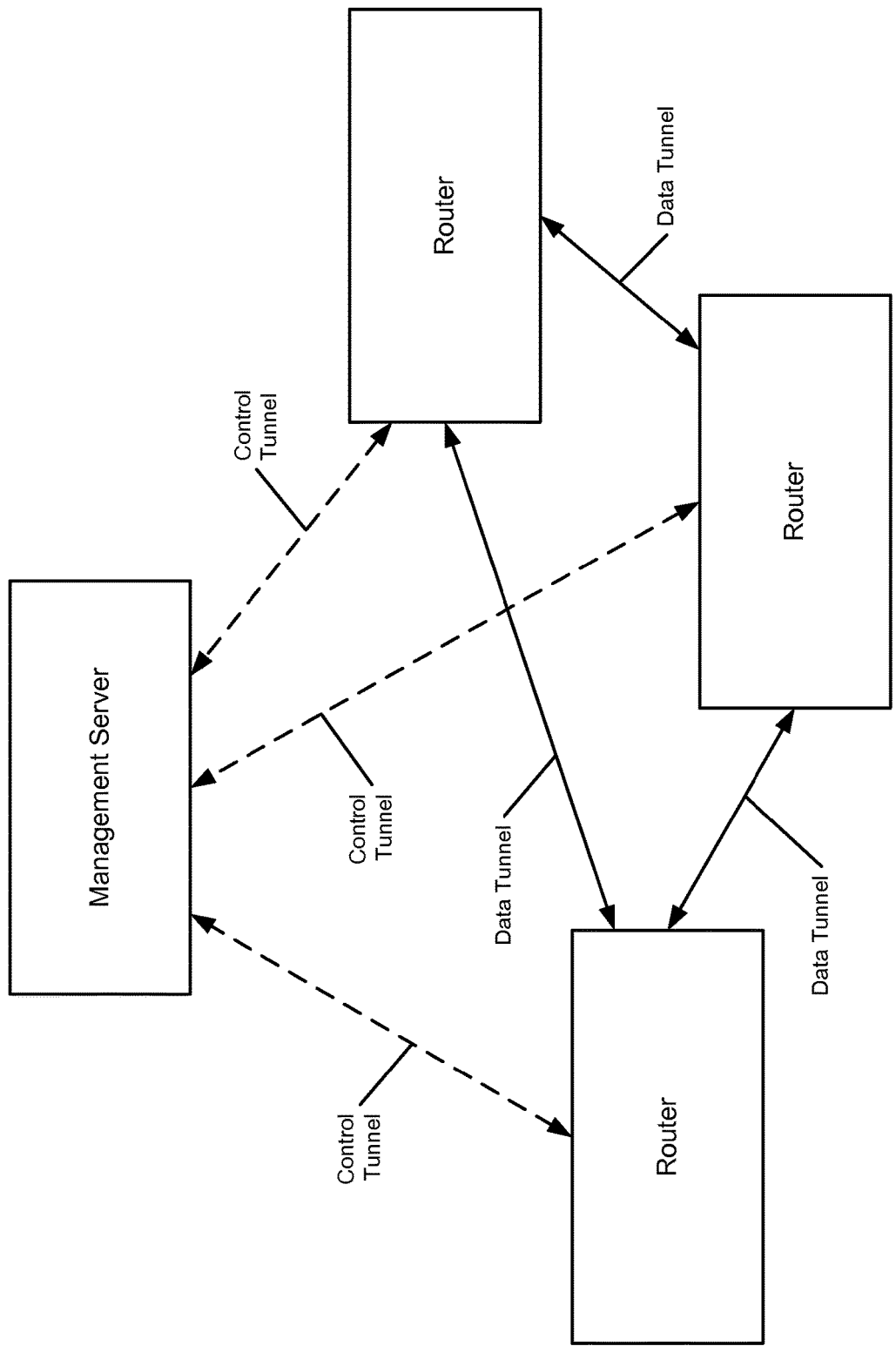

Configuration module 114 establishes a VPN tunnel with each of the VPN peers for data traffic. In this example, between router 102 and router 103, configuration module 114 establishes VPN tunnel 121 using a corresponding tunnel key pair shared by routers 102-103 (e.g., while in some embodiments these keys are manually entered, the embodiment of FIG. 1 shows the VPN data tunnels are established using tunnel keys generated and downloaded from management server 101 as part of MS configuration information 118). That is, each of the routers is to establish a VPN tunnel (also referred to as a data tunnel) with each of the remaining peers, while maintaining a separate tunnel (also referred to as a control tunnel) coupling with management server 101 for control traffic (e.g., configuration commands, configuration data, notification, etc.), as shown in FIG. 2. The VPN data tunnels directly coupling each pair of peers form a mesh VPN. The data traffic going through the VPN data tunnels are encrypted and decrypted using the corresponding tunnel keys.

Based on MS configuration information 118 and VPN NAT traversal information 119, forwarding module 115 can properly forward a packet to an opposing VPN peer via the corresponding VPN data tunnel. In one embodiment, forwarding module 115 is configured to determine a best IP address/port to the corresponding VPN subnet based on a VPN peer subnet route table of MS configuration information 118 and IP registry information from VPN NAT traversal information 119. In another embodiment, an optional forwarding table 120 mapping a VPN subnet and the best IP address/port is created from the VPN peer subnet route table of MS configuration information 118 and IP registry information from VPN NAT traversal information 119. Forwarding module 115 can select the best IP address/port from the forwarding table 120 when forwarding a packet.

According to one embodiment, subsequently, when there is a change in the configuration, such as adding or removing a router, changing of subnet settings, CM module 111 is configured to generate updated configuration information 108 and communicate the updates to routers 102-103 via their corresponding control tunnels (such communication can be done with different mechanisms depending on the embodiment of type of information, including a push mechanism, a pull mechanism, etc.). For example, CM module 111 may generate new VPN peer subnet route information based on the change of configuration of a router and/or subnet, and the updated VPN peer subnet route table(s) is then sent from management server 101 to routers 102-103 via the corresponding control tunnels. Note that some or all of the modules as shown in FIG. 1 can be implemented in software, hardware, or a combination of both.

Figure 3:
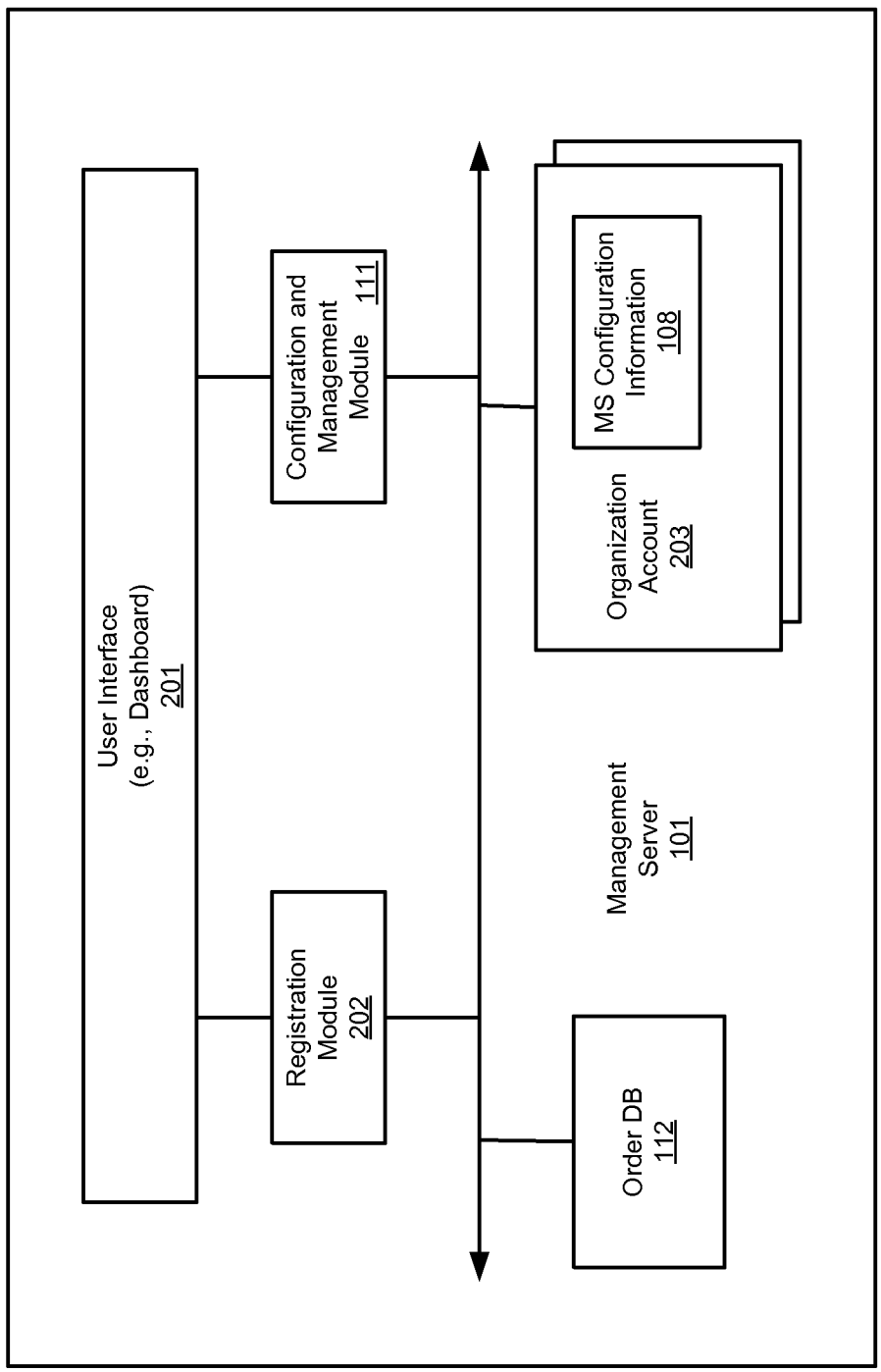
FIG. 3 is a block diagram illustrating a management server according to one embodiment.

FIG. 3 is a block diagram illustrating a management server according to one embodiment. Referring to FIG. 3, management server 101 includes user interface 201, registration module 202, and CM module 111. User interface 201 may be a Web interface, such as those as shown in FIGS. 8A-8D, to allow a user (or administrator, owner) to log in and create organization account 203. From user interface 201, a user can register by providing an order number or invoice number, or other identification information identifying a list of routers to be configured. In response, registration module 202 identifies, from order database 112, a list of routers associated with the order number that have been purchased by the organization and creates an organization account for the registered routers. In addition, the user may also enter certain configuration information (e.g., user input configuration information 109 of FIG. 1), such as VPN participation settings and VLAN/subnet settings, etc. This information may be user configurable via the user interface. That is, the user can specify certain settings. However, if there is no user setting, in one embodiment the management server will automatically fill in default setting information. In response, CM module 111 is configured to automatically compile and generate other information (e.g., automatically calculated VPN configuration information 110 of FIG. 1). The configuration information is then stored in the corresponding organization account 203 as part of MS configuration information 108. CM module 111 may also detect and/or resolve subnet conflicts for the user-specified subnet settings, and if there is a conflict, the system may alert the administrator.

One problem with large VPNs is ensuring that there are no subnet collisions. This is particularly difficult and error prone since it requires checking all the existing subnets. Problems can arise if the routers order the routes incorrectly, or if they overlap with upstream subnets they are plugged into. This can happen if a router is plugged into an Internet service provider (ISP) over which the network operator does not have control, or if it is behind a NAT. Also, an operator may accidentally enter a subnet that is too large. To make this process simpler, according to one embodiment, the system implements a few mechanisms.

First, each router prioritizes the local uplink subnet route above routes to the VPN. This ensures that any router will never be disconnected because of a subnet that overlaps with its uplink connection and a subnet through the VPN.

Second, the VPN routes are sorted by "longest subnet first." As a result, even if there are overlapping subnets, it is very likely that most routes will work.

Third, the system checks for subnet collisions when an operator makes a configuration change and alerts them to problems if they exist. According to some embodiments, the system treats all subnet allocations in an organization as if they were coming from a VPN subnet. This prevents having a conflict by default. Most subnets are reserved by the Internet Assigned Number Authority (IANA) for public use, and there are a limited number of private subnet spaces that can be used for networks like VPNs (e.g., 192.168.0.0116, 172.16.0.0112, and 10.0.0.0/8). Also, it is desirable for a subnet allocation algorithm to continue to allocate addresses that, to the network administrator, look like they continue with the allocation scheme (i.e. if 10.0.0/24 was added, the operator would expect that any subnet corresponding to 10.0.X.0/24 would be selected next). If most routers are plugged into particular subnets in their local configuration, it is desirable that the system avoid those (for instance, if most routers deployed are behind cable modems using 10.x.x.x/16 as their local LAN, it is beneficial to avoid that subnet). In one embodiment, it is preferable to use private IP addresses for the VPN addresses. However, it is also possible to use public IP addresses. In this situation, traffic between those IPs and any within the VPN will be routed over the VPN. This may be desirable because it will encrypt the traffic.

Fourth, the system automatically finds and assigns an appropriate subnet to a new router device when it is added to the network. In one embodiment, the allocation algorithm gathers all subnets currently used. This includes all VPN subnets, all other subnets not participating in VPN but allocated by the system as local subnets, and all "upstream" subnets in use by all routers (this is specifically to reduce the potential for routing conflicts). It sorts the private addresses by the number of subnets currently used. For each subnet in order, it tries to allocate appropriate subnets that don't overlap with current ones and to allocate a subnet, sort the subnets according to RFC-3531 and choose the subnet if no overlap currently exists.

Figure 4:
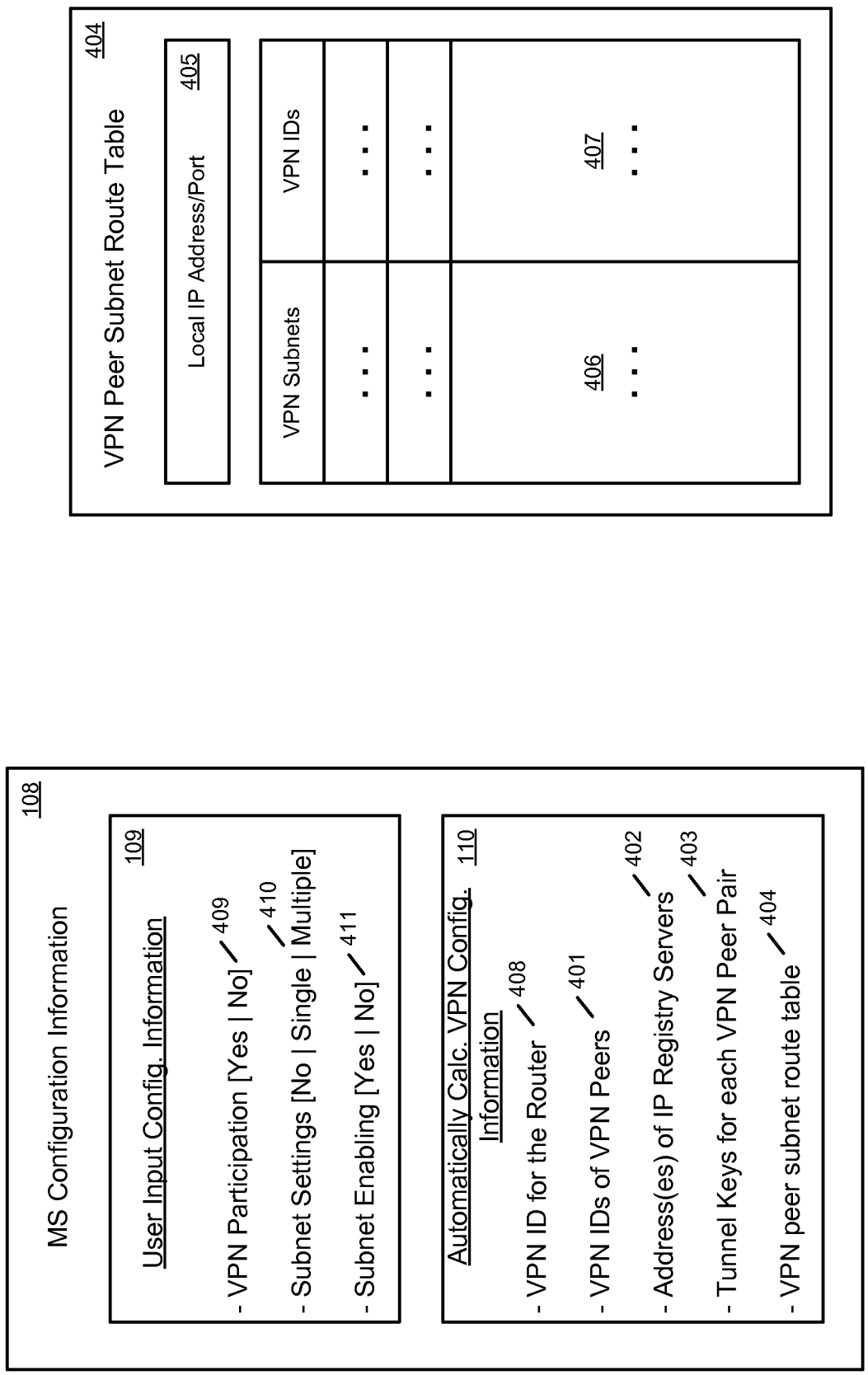
FIG. 4A is a diagram illustrating an example of MS configuration information according to one embodiment of the invention.
FIG. 4B is a diagram illustrating an example of a VPN peer subnet route table according to one embodiment of the invention.

FIG. 4A is a block diagram illustrating an example of MS configuration information according to one embodiment. Referring to FIG. 4A, MS configuration information 108 includes user input configuration information 109 and automatically calculated VPN configuration information 110. In one embodiment, user input configuration information 109 for each router includes, but is not limited to, VPN participation setting 409 indicating whether the router will participate in the VPN. In one embodiment, by default, the router will participate in the VPN. User input configuration information 109 further includes subnet settings 410 and whether a particular subnet is enabled 411. In one embodiment, if an administrator leaves the subnet settings unspecified, the management server will automatically allocate and assign a subnet to the router. The administrator can specify a subnet as a single subnet for all downlink interfaces or alternatively, the administrator can specify multiple subnets. If the administrator provides specific subnet settings, the management server will verify the user-specified subnets to ensure that no subnet overlapping occurs. If there is subnet overlapping, the management server may alert the administrator.

In one embodiment, automatically calculated VPN configuration information 110 is specific to each router and includes for each router, but is not limited to, VPN ID for the router 408, VPN IDs of VPN peers 401, one or more addresses of one or more IP registry servers 402, tunnel keys for each VPN peer pair 403, and VPN peer subnet route table 404. VPN IDs for the routers may be automatically generated by management server 101 when the corresponding routers were registered with management server 101. In one embodiment, a VPN ID is an identification string randomly generated by the management server and guaranteed to be unique. Alternatively, a serial number may be utilized as a VPN ID. Address(es) of IP registry server(s) 402 may be used by a configuration module of the router to access one or more IP registry servers to obtain the IP addresses/ports of the VPN peers. Address(es) of IP registry server(s) 402 may point back to the management server if the management server provides the IP registry services.

In one embodiment, tunnel keys 403 are generated by management server 101, which may be used by the router to establish a VPN data tunnel with each of the peers identified by VPN IDs 401. At least one of tunnel keys 403 may also be used to establish a control tunnel between the router and the management server. Alternatively, the control tunnel may be established using a private key (e.g., private key 116 of FIG. 1) embedded within the router during the manufacturing. In addition to configuration updates, the control tunnel may also be used to download the IP registry information from the management server if the management server provides such services. In such an example, address (es) of IP registry server(s) 402 may not be needed. An example of the IP registry information is shown in FIG. 6A.

FIG. 4B is a block diagram illustrating an example of a VPN peer subnet route table according to one embodiment of the invention. Referring to FIG. 4B, in one embodiment, VPN peer subnet route table 404 is constructed for each of the routers in the VPN. Thus, each VPN peer subnet route table may be different for each router, while some information stored therein may be identical. In this way, certain information of a router may not be exposed to other routers or peers. Alternatively, VPN peer subnet route table 404 may be implemented as a single table or data structure common to all peers to maintain all VPN subnets for all peers. In one embodiment, VPN peer subnet route table 404 includes local IP address/port section 405 for the associated router. This is the IP address for the uplink interface of the router, which may be coupled to an external network. In addition, VPN peer subnet route table 404 includes a list of subnets 406 and VPN IDs 407 associated with the subnets. The subnets 406 may represent the subnets that participate in VPN, which may be configured by an administrator as part of user input configuration information 109 of FIG. 1. This subnet information may be collected and/or generated by the management server when the administrator registers the routers via the user interface (also referred to as a dashboard) provided by the management server. Some of the subnets may be specifically provided by the administrator and verified by management server 101 to ensure that there is no subnet overlap with other subnets currently used. Some of the subnets may be automatically allocated and assigned by management server 101 (e.g., the default option when no subnet has been specified by the administrator).

Referring back to FIG. 3, CM module 111 is also responsible for handling configuration changes and recompiling the MS configuration information 108 for the affected account 203. For example, an administrator of an organization may add or remove a router from the VPN. The administrator may also change the subnet settings of an existing router. Such changes have an impact on MS configuration information 108. In current VPN systems, adding a device to the VPN requires modifying routing tables on many devices (which previously required logging in to each individual device) and is prone to manual error. It also previously required distribution of keys and remote contact points to each device that wants to route to the device and participate in the VPN.

According to one embodiment, once a configuration change is made by a network administrator (for instance, adding a device to the VPN), CM module 111 automatically checks for overlapping subnets and warns the user if they are potentially causing routing problems and tells them which devices may have issues. In addition, CM module 111 regenerates configurations (i.e. subnets, etc) for each device in the VPN. For each device configuration that has changed, CM module 111 pings the device and notifies the device of a configuration change. This results in immediate changes, as part of MS configuration information 108, being pushed out to all the routers participating in the VPN.

Furthermore, in order for the system to be multi-tenant, each peer registry must be able to handle connections from a large number of VPN devices and also cannot reveal confidential information. In order to do this, according to one embodiment, the management server assigns peer VPN IDs using a cryptographic hash of a {private key, device key} where the private key is only known to the management server, and the device key (e.g., serial number) is only known by the router and the management server. The result of this hash can be shared with other VPN peers that are connecting to the routers, but it does not reveal the private key or device key to other parties. Also, it makes it cryptographically harder to determine the peer VPN ID for a particular device without knowing the device key and private key. Since the peer VPN IDs are distributed through a secure channel, it makes it impossible for a third party to query information without knowledge of peer VPN IDs.

Figure 5:
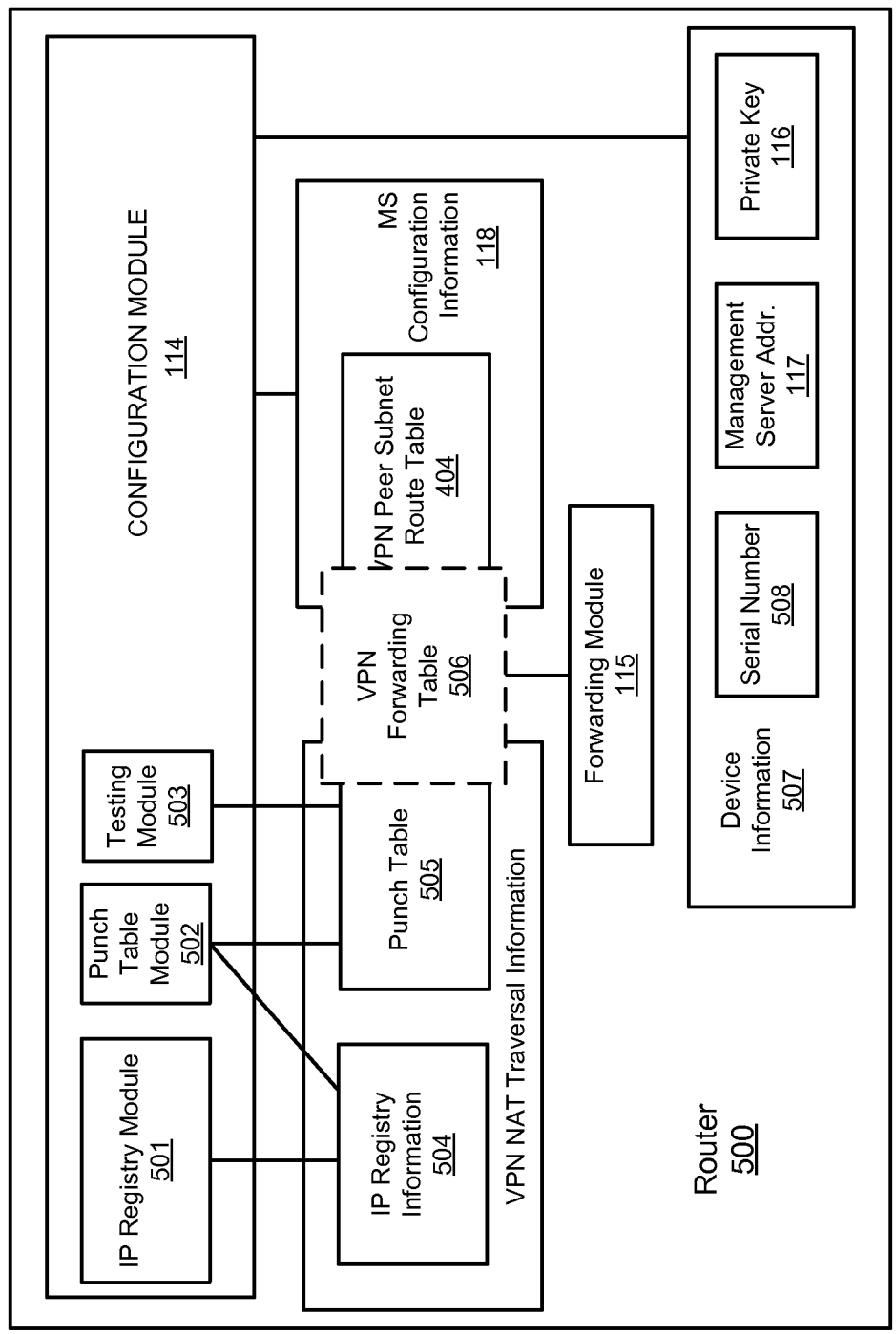
FIG. 5 is a block diagram illustrating an example of a router according to one embodiment of the invention.

FIG. 5 is a block diagram illustrating an example of a router according to one embodiment of the invention. Router 500 may represent any of routers 102-103 of FIG. 1. Referring to FIG. 5, router 500 includes, but not limited to, configuration module 114 for configuring router 500 and forwarding module 115 for forwarding packets to a destination based on the configuration. It is assumed that an administrator associated with router 500 has registered router 500 with the management server as described above. In one embodiment, when router 500 is powered up and coupled to the network, according to one embodiment, configuration module 114 performs any self-initialization and obtains an IP address for router 500 from a DHCP service provider to enter the network. The IP address can be obtained from an Internet service provider (ISP) or a local DHCP server (e.g., DSL/cable modem). The IP address can be a public IP address if router is directly coupled to the Internet or a local IP address if router 500 is behind a NAT device.

Once configuration module 114 obtains the IP address, according to one embodiment, it contacts the management server based on IP address 117 of the management server, where IP address 117 is stored in a storage device of router 500 during the manufacturing. In addition, configuration module 114 may sign the message using private key 116 to allow the management server to authenticate router 500. Private key 116 may also be stored in the storage device of router 500 during the manufacturing. The corresponding public key is maintained by the management server, where the management server is to authenticate router 500 using the public key. Once router 500 has been successfully authenticated by the management server, in one embodiment, configuration module 114 downloads MS configuration information 118 from the management server. MS configuration information 118 includes VPN peer subnet route data structure 404 and other information as shown in FIGS. 4A and 4B.

Upon initialization of the VPN module, router 500 establishes a connection with one or more IP registries to alert the system of its presence and find contact information (IP/ports) that its peers are located on. It also uses the IP registries to check network settings and see if it is behind a NAT/firewall and if those connections allow VPN traffic. In one embodiment, when router 500 registers with an IP registry, it sends the following information: the VPN ID of the router, the local IP/port it is using to send data on, the list of peer VPN IDs the device is interested in discovering. In response, the IP registry responds with a combination of the remote IP address/port the connection was received on and a list of peer contact information (the VPN IDs of VPN peers as well as local and public IP addresses/ports they used).

Router 500 may contact multiple IP registries and aggregate the received information. First, it compares the responses to detect NAT compatibility of the uplink connection (e.g., whether the device can send and receive outgoing UDP traffic, whether the device has a public IP address (i.e. no NAT), if the upstream device is behind a NAT, how restrictive it is). The registries respond with the IP address/port the original packet used; this can be used to see if upstream devices allow preserving source port for NAT traffic. Also included in the response is VPN peer contact information (combinations of possible IP addresses/ports). This can be used to establish a contact with each peer through the hole-punching protocol. Using an IP Registry also has many advantages; devices cache information from the registry, so in the case of internet outages to the rest of the backend, data continues to flow.

Current VPNs often deploy a concentrator to simplify configuration (i.e. adding a device can happen on two devices instead of each one in the VPN), but this has undesirable reliability properties and requires more bandwidth at the concentrator, since traffic from one device to another always must go through the concentrator. Another possible design is to use the hole punching techniques but have traffic go through the registries; this is also undesirable, since it would mean the IP registries would need to be capable of sending and receiving all data going through the VPN. Embodiments of the VPN system described herein use the IP registry to communicate contact information with each VPN end point, and thus only deals with control traffic; this allows each router to send traffic directly to the router that its traffic is destined for. The routers also cache the peer contact information (e.g., IP address/port). As a result it can survive network outages even if the IP registry goes down.

Specifically, referring back to FIG. 5, IP registry module 501 of configuration module 114 obtains IP registry information 504, which lists the IP addresses/ports of router 500 and other VPN peer routers. IP registry information 504 can be obtained from one or more IP registry servers (e.g., IP registry server(s) 122 of FIG. 1), whose IP address(es) may be provided as part of downloaded MS configuration information 118 (e.g., IP address(es) 402 of FIG. 4A). Alternatively, IP registry information 504 may be obtained from the management server as part of the download. IP registry information 504 may also be obtained via other mechanisms. IP addresses/ports in responses from multiple IP registries can be compared to determine whether 500 is behind a NAT that is amenable to hole punching (i.e. performs "consistent endpoint translation").

An example of IP registry information 504 is shown in FIG. 6A. Referring to FIG. 6A, IP registry information 504 includes local device information 601 and peer device information 602 for each peer. Local device information 601 includes a VPN ID for the router, a local IP address of the router, and a public IP address of the router. The local IP address and the public IP address may be different or identical. If the router is coupled to the network via a NAT device (e.g., DSL/cable modem), the local IP address and the public IP address are different. The local IP address represents an IP address associated with an uplink interface of the router, while the public IP address represents an IP address associated with the NAT device. If there is no NAT device located between the router and the network, the local IP address and the public IP address will be the same. Similarly, VPN peer device information 602 for each peer includes a VPN ID for the peer, a local IP address of the peer, and a public IP address of the peer. The local IP address and the public IP address may or may not be the same dependent upon whether that peer router is located behind a NAT device. Note that IP registry information 504 can be maintained and stored in a variety of data structures or databases. Note that information as described in view of FIGS. 6A and 6B can be stored in a variety of data structures or databases.

Referring back to FIG. 5, based on IP registry information 504, punch table module 502 builds punch table 505, where punch table 505 is indexed based on VPN IDs. An example of punch table 505 is shown in FIG. 6B. Referring to FIGS. 5 and 6B, punch table 505 includes records indexed based on VPN IDs 651. Each VPN ID is associated with contact information 652 having a local IP address/port combination and a public IP address/port combination. Each of the local IP address and public IP address of each VPN ID is associated with status of that IP address, representing the latency or bandwidth to reach that IP address. The status 653 may be periodically determined or measured by testing module 503. In one embodiment, for each of the IP addresses 652 listed in punch table 505, testing module 503 is configured to periodically send a message such as a HELLO message or to ping the IP address and to measure the latency of receiving a response. Based on the measured latency, testing module 503 then updates status field 653 associated with the IP address. If a response has not been received within a predefined time period, testing module 503 may mark the corresponding IP address unavailable or with high latency. The status can be used to determine which of the IP addresses/ports is most appropriate or best (e.g., lowest latency) when forwarding a packet to the remote VPN peer.

According to one embodiment, when forwarding module 115 receives a packet to be forwarded to a remote node, forwarding module 115 looks up in VPN peer subnet route table 404 based on the destination IP address (e.g., subnet) of the packet to retrieve a VPN ID associated with the destination IP address. Based on the VPN ID, forwarding module 115 then looks up in punch table 505 to locate an IP address/port that is most suitable at the time based on the corresponding status (e.g., status 653). For example, forwarding module 115 may select either a local IP address or a public IP address associated with the VPN ID, whichever has a lower latency. In one embodiment, if both the public IP address and the local IP address has the same latency level, the local IP address will be selected, in which the traffic can directly reach the remote router, bypassing the NAT device in between (e.g., through the "punched" hole). Once the IP address has been selected from the punch table, the packet is encapsulated within another packet using the selected IP address as the destination IP address. The encapsulated packet is then forward to the remote router by forwarding module 115.

In the above embodiment, two data structures are used—the VPN peer subnet route table and the punch table—that are linked are keys by VPN ID. These two data structures effectively function as a forwarding table. Alternatively, according to another embodiment, a VPN forwarding table 506 is built from these two data structures; the VPN forward table 506 includes the subnets from the VPN peer subnet route table, and for each subnet, includes the best combination of IP address/port from the punch table for that subnet (in other words, it drops the VPN IDs and non-best combinations of IP addresses/ports). As a result, when a packet is received by forwarding module 115, instead of looking up in punch table 505 and VPN peer subnet route table 404, forwarding module 115 only needs to look up in VPN forwarding table 506 based on the subnet to locate the "best" IP address to forward the packet.

The above techniques for reaching a node behind a NAT device based on a local IP address that is not published in the WAN are referred to as hole punching. Further detailed information concerning the hole punching techniques can be found in the article entitled "Peer-to-Peer Communication Across Network Address Translators" published by Bryan Ford, et. al, which is incorporated by reference herein in its entirety. Note that some or all of the components as shown in FIG. 5 may be implemented in software, hardware, or a combination of both.

Figure 7A:
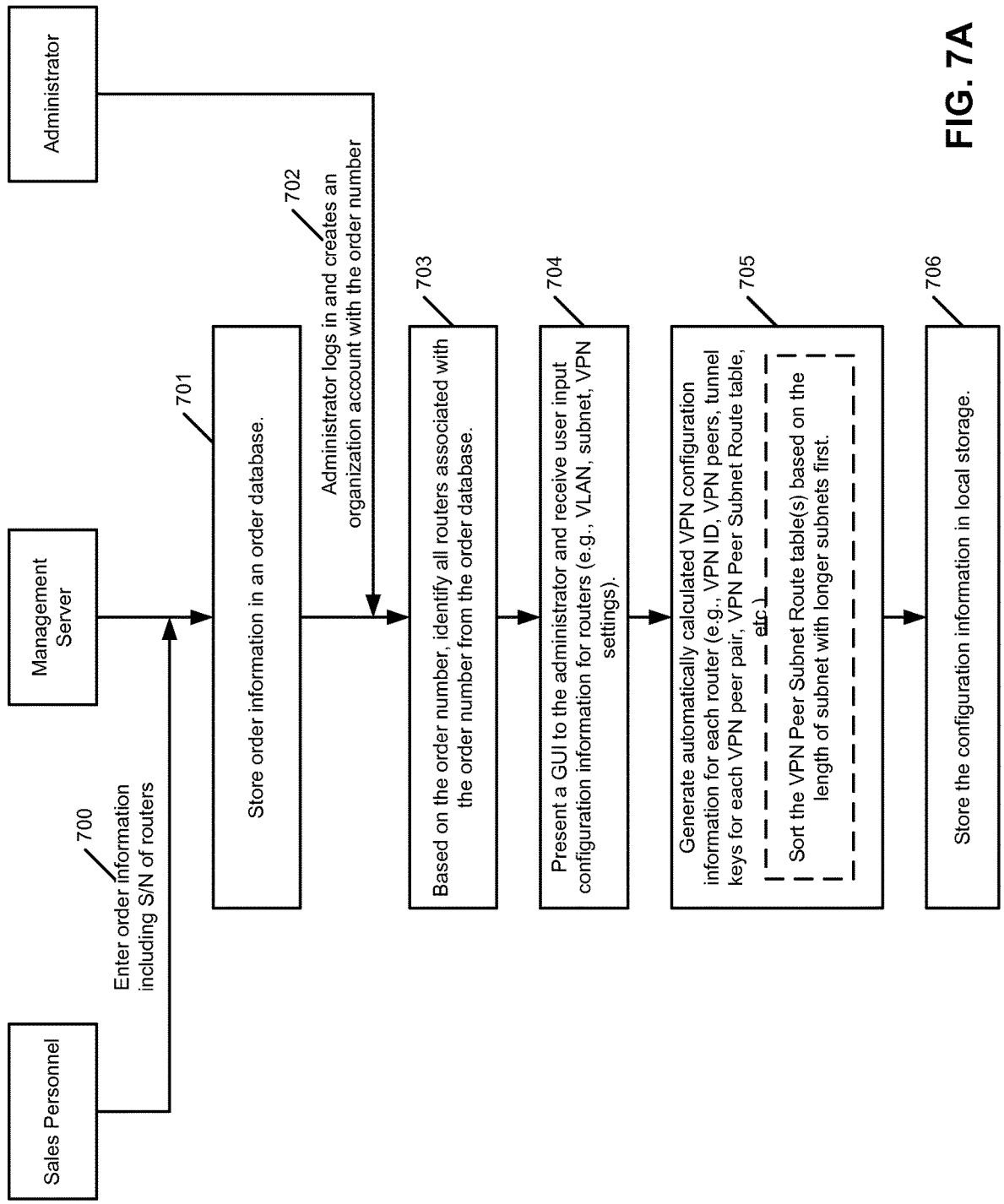
FIGS. 7A and 7B are flow diagrams illustrating methods to generating configuration information according to certain embodiments of the invention.

FIG. 7A is a flow diagram illustrating a method for generating configuration information according to one embodiment of the invention. The method as shown in FIG. 7A may be performed by management server 101 described above. Referring to FIG. 7A, initially, during transaction 700, a sales personnel enters at a management server the order information of routers purchased by an organization (e.g., owner), where the order information identifies each of the routers purchased (e.g., serial numbers). At block 701, order information is then stored in an order database (e.g., order database 112). Subsequently, during transaction 702, an administrator of the organization logs in and creates an organization account by providing an order number of the purchase. At block 703, based on order number received from the administrator, all of the routers associated with the order number are identified from the order database. At block 704, a graphical user interface (GUI), such as a Web page, is presented to the administrator to give the administrator the option to enter user input configuration information (e.g., user input configuration information 109) for the identified routers (e.g., VLAN/subnet settings, VPN settings). An example of the GUI is shown in FIGS. 8A-8D. Also, in some embodiments, the VLAN/subnet settings also include a VLAN participation setting for each VLAN that identifies whether the VLAN is to participate in the VPN or not.

Based on the user configurable information, at block 705, the management server generates automatically calculated VPN configuration information (e.g., automatically calculated VPN configuration information 110) for each of the routers, including, for example, VPN ID, VPN peers, tunnel keys for each VPN peer pair, VPN peer subnet route table, etc. Optionally, the VPN peer subnet route table(s) may be sorted based on the length of the subnet with longer subnet having a higher priority. As described above, the user input configuration information and the automatically calculated configuration information are collectively referred to as MS configuration information (e.g., MS configuration information 108). Thereafter, at block 706, the MS configuration information is stored in the local storage of the management server. While the illustrated embodiment generates the automatically generated VPN configuration information 110 specific to each router participating in the VPN, alternative embodiments provide the same information to all of the routers and the routers ignore that of the information that is not relevant to them (e.g., the VPN peer information would include the VPN IDs of all the routers participating in the VPN, including the router's own VPN ID). One of the purposes of sorting the VPN peer subnet route table based on the length of the subnets is to reduce the possibility of failure to route traffic to conflicting subnets. It can also speed up searching and allocating a non-overlapping subnet for new or modified subnet settings. As a result, even if there are overlapping subnets, it is likely that most routes will work.

For example, it is assumed there are three subnets which overlap:

10.0.0.0/24
    10.0.0.0116
    10.0.0.0/8

This could also be represented by:

10.0.0.0/255.255.255.0
    10.0.0.0/255.255.0.0
    10.0.0.0/255.0.0.0 where 24=how many bits are in the subnet 255.255.255.0. If a packet is sent to 10.0.0.1, the forwarding module would choose the entry for 10.0.0/24 since it is most specific subnet/netmask. If a packet is sent to 10.1.0.1, it would choose 10.0.0.0/8, since it does not match the other two. In this case, an alert will be sent to the user that they have some subnets that overlap and tell them this is how we sort them. Detailed information concerning the IP forwarding techniques can be found in RFC-1812. An embodiment of the invention is to prioritize the uplink subnet above all subnets in the VPN router table (even if they overlap), and the system detects when this happens and alerts the user to the fact that some of them overlap.

Figure 7B:
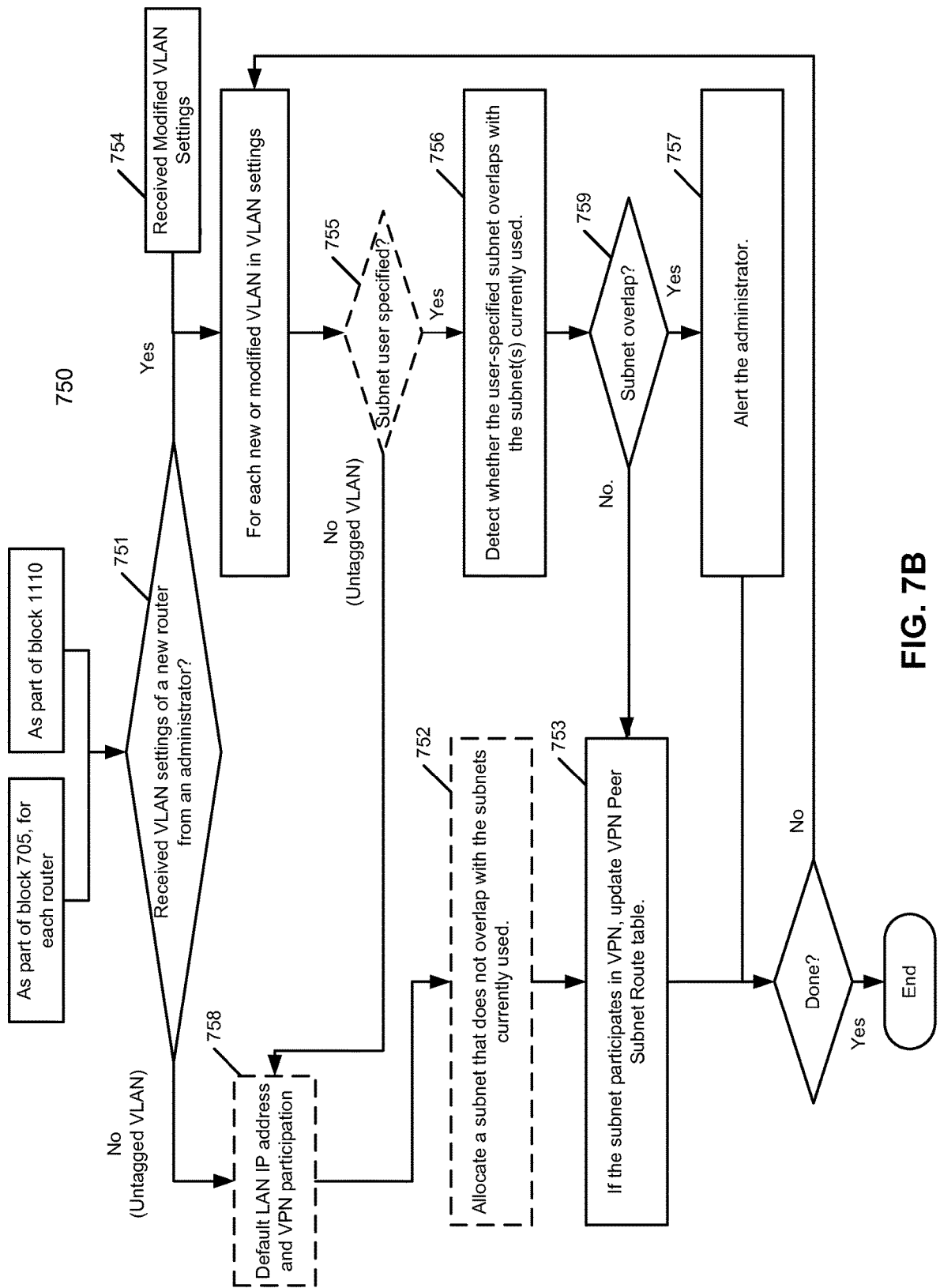

FIG. 7B is a flow diagram illustrating a method for processing subnet settings according to one embodiment of the invention. Method 750 may be invoked from blocks 705 of FIG. 7A or block 1110 of FIG. 11. Alternatively, method 750 may be performed in response to a modification of VLAN/subnet settings. Referring to FIG. 7B, at block 751, it is determined whether VLAN/subnet settings of a new router are received from an administrator (e.g., via GUI). If there is no VLAN/subnet setting received, that means an untagged VLAN will be formed using a default LAN IP address and a default VPN participation setting (block 758), and, at block 752, processing logic gathers all of the subnets that are currently used and allocates a subnet to the new router that does not overlap with the subnets currently used. At block 753, if the subnet and router participate in VPN, the VPN peer subnet route table for the new router is updated, for example, by adding the newly assigned subnet and its VPN ID to the VPN peer subnet route table.

If VLAN/subnet settings for the new router are received at block 751 or modified VLAN/subnet settings of an existing router are received at block 754, for each of the new or modified VLAN/subnet settings, at block 755, it is determined whether any subnet has been specified by the administrator. If there is no subnet setting specified by the administrator, it will be treated as a default option and the processes of blocks 752-753 are performed. If it is determined there is a user specified subnet, at block 756, the configuration and management module of the management server detects whether the user-specified subnet overlaps with the subnets currently used. If it is determined there is an overlap subnet, at block 757, the administrator is alerted; otherwise, the VPN peer subnet route table is updated at block 753. These operations are repeatedly performed for each of the VLAN/subnet settings.

Figure 8A:
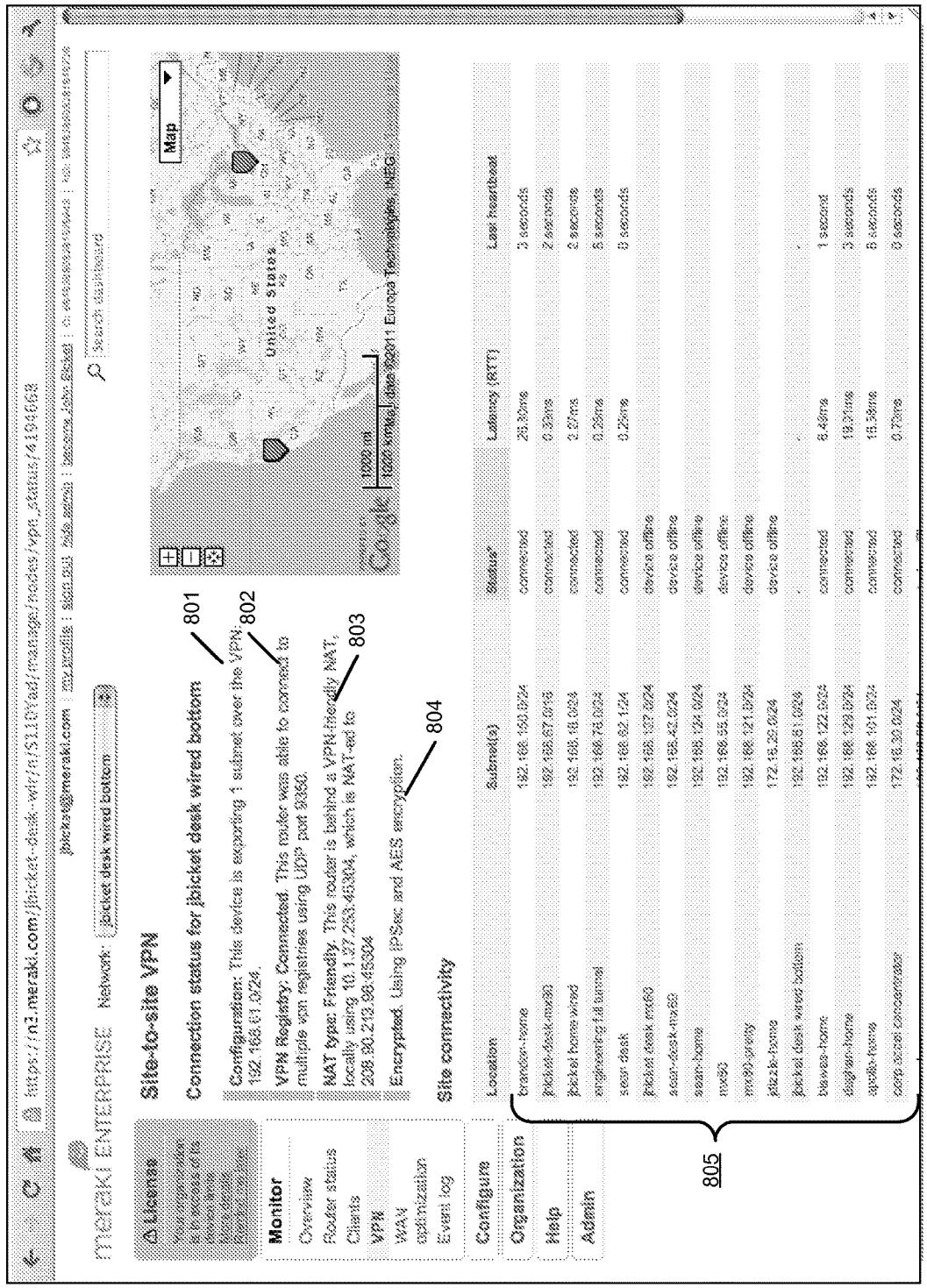

FIGS. 8A-8D are screenshots illustrating an example of a graphical user interface for configuring routers according to one embodiment of the invention. For example, the GUis as shown in FIGS. 8A-8D may be presented by user interface 201 of management server 101 in FIG. 3. Referring to FIG. 8A, the GUI as shown in FIG. 8A includes multiple tabs for a variety of purposes or functionalities. In this example, the page as shown can be used to monitor and display current site-to-site VPN status information, including information 801 indicating the subnet(s) currently exported over the VPN, IP registry connectivity 802, NAT information 803 (e.g., whether the router is behind a NAT device), and the encryption methods used 804. In addition, the status of a list of VPN peers 805 is shown with their respective subnets, as well as information indicating whether certain VPN peers are online or offline. If a VPN peer is online, the latency measured by the testing module is shown.

Figure 8B:
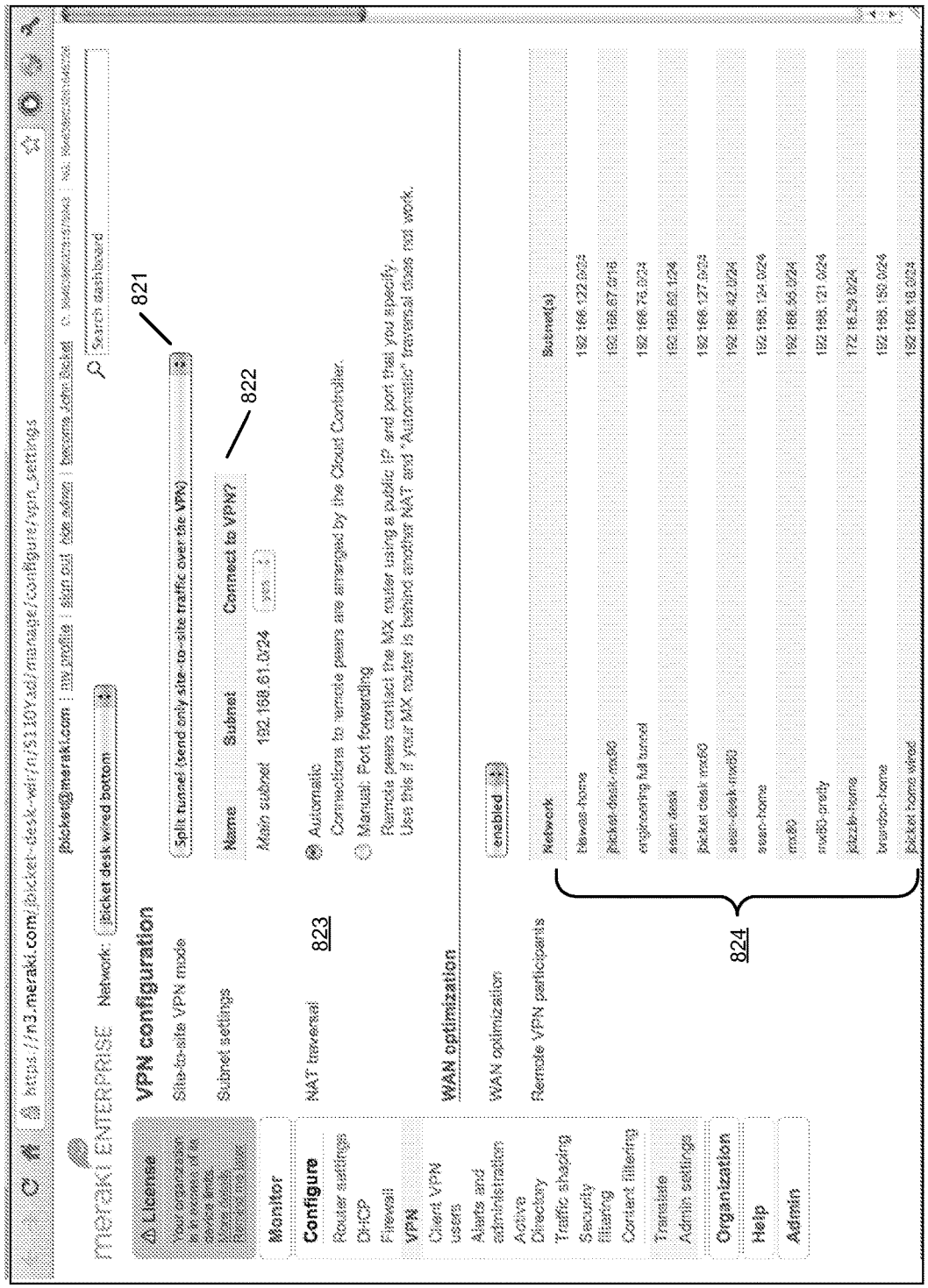

Referring to FIG. 8B, the GUI as shown is a VPN configuration page according to one embodiment. In this example, a user can set up a VPN mode via field 821, either a split tunnel mode or full tunnel mode. In the split tunnel mode, only the site-to-site traffic is sent over the VPN tunnel. That is, if a subnet is at a remote site, the traffic destined for that subnet is sent over the VPN. However, if traffic is destined for a network that is not in the VPN mesh (e.g., traffic going to a public Web service), the traffic is not sent over the VPN but instead is routed directly to the Internet from the local router. In the full tunnel mode, all traffic will be sent over the VPN tunnel. In this situation, all traffic is sent through a full tunnel concentrator. Thus, regardless of the mesh VPN route map, all traffic is redirected to a VPN concentrator. No traffic goes directly to the Internet. In such a configuration, the user has to specify which router operates as a VPN concentrator. In addition, a user can set up subnet information via field 822. In this example, the user can specify a name for the subnet, the specific subnet, and an indication of whether the specified subnet will participate in the VPN. This is the subnet that will be exported over the VPN and can be seen by other VPN peers 824. A user can also specify via field 823 whether NAT traversal can be automatically performed or manually configured as port forwarding.

Figure 8C:
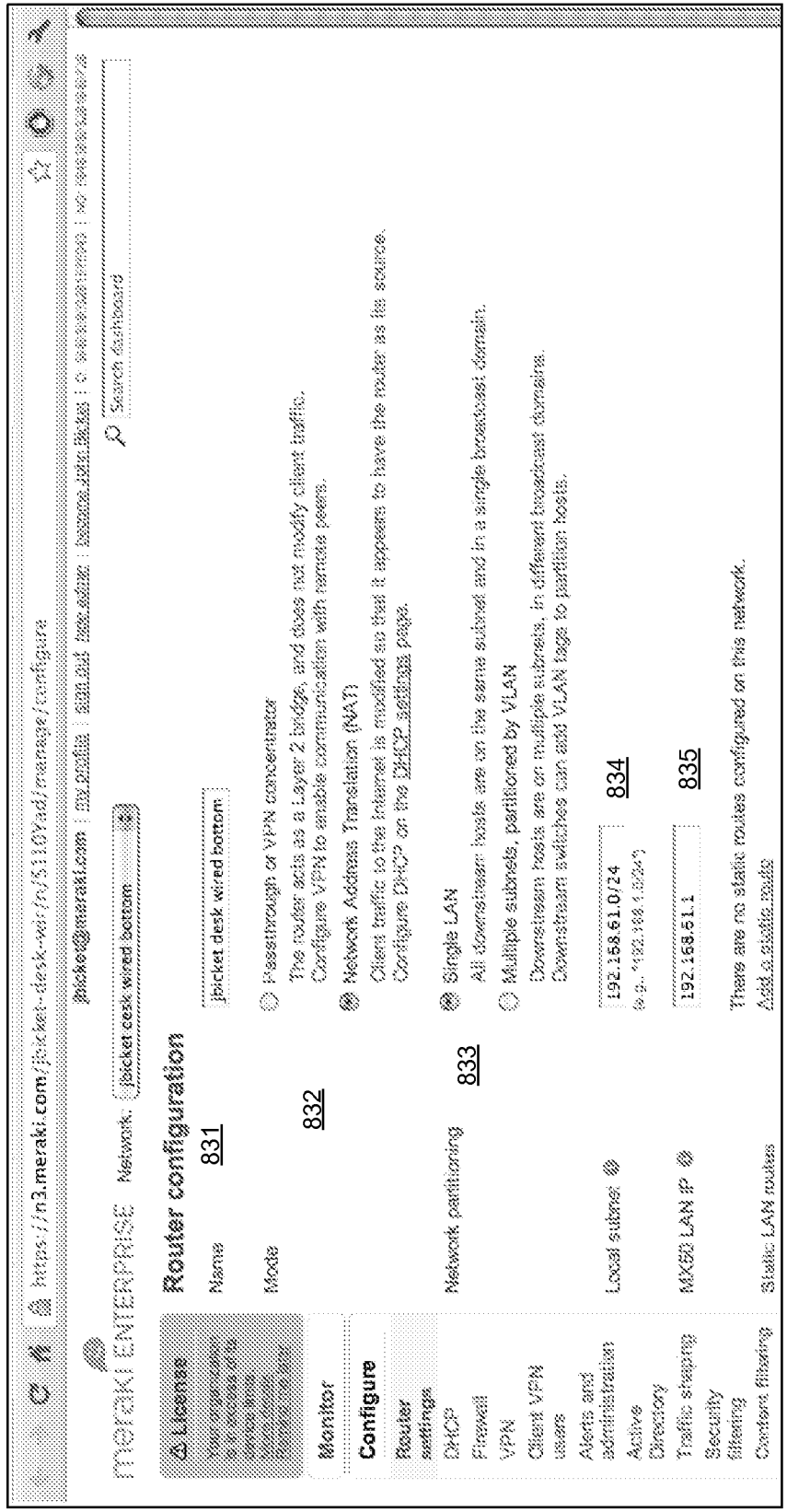

Referring to FIG. 8C, the GUI page as shown is used to configure a router. A user can provide a name for the router via field 831. The user can configure via field 832 the router to operate as a passthrough or VPN concentrator, or a NAT device. If the router is configured as a passthrough or VPN concentrator, the router acts as a layer-2 bridge and does not modify client traffic. The router does not perform any address translation and operates as a passthrough device between the WAN and the LAN ports. Any DHCP requests from the LAN are forwarded upstream. When a router operates as a VPN concentrator, the router provides tunneling functionality as a VPN concentrator to a data center. If the router is configured as a NAT device, the router operates as a layer-7 firewall to isolate and protect the LAN traffic from the WAN. The client traffic to the Internet is modified by the router, such that it appears to have the router as its source. The user can also partition the LAN via field 833, where the LAN can be a single LAN or partitioned into multiple subnets partitioned by VLAN. If the router is configured to have a single LAN, all downstream devices are on the same subnet and in a single broadcast domain. In addition, a user can further specify a local subnet via field 834 and a local IP address for the router via field 835. This is the address for the router in the local subnet and one can ping the router using this IP address from a client on the subnet that is connected to any one of the LAN ports. If the user does not specify the local subnet in field 834 and/or local IP address in field 835, the management server automatically allocate a non-overlapping subnet for the router in one embodiment of the invention as previously described. The local IP address may also be automatically allocated via a DHCP service.

Figure 8D:
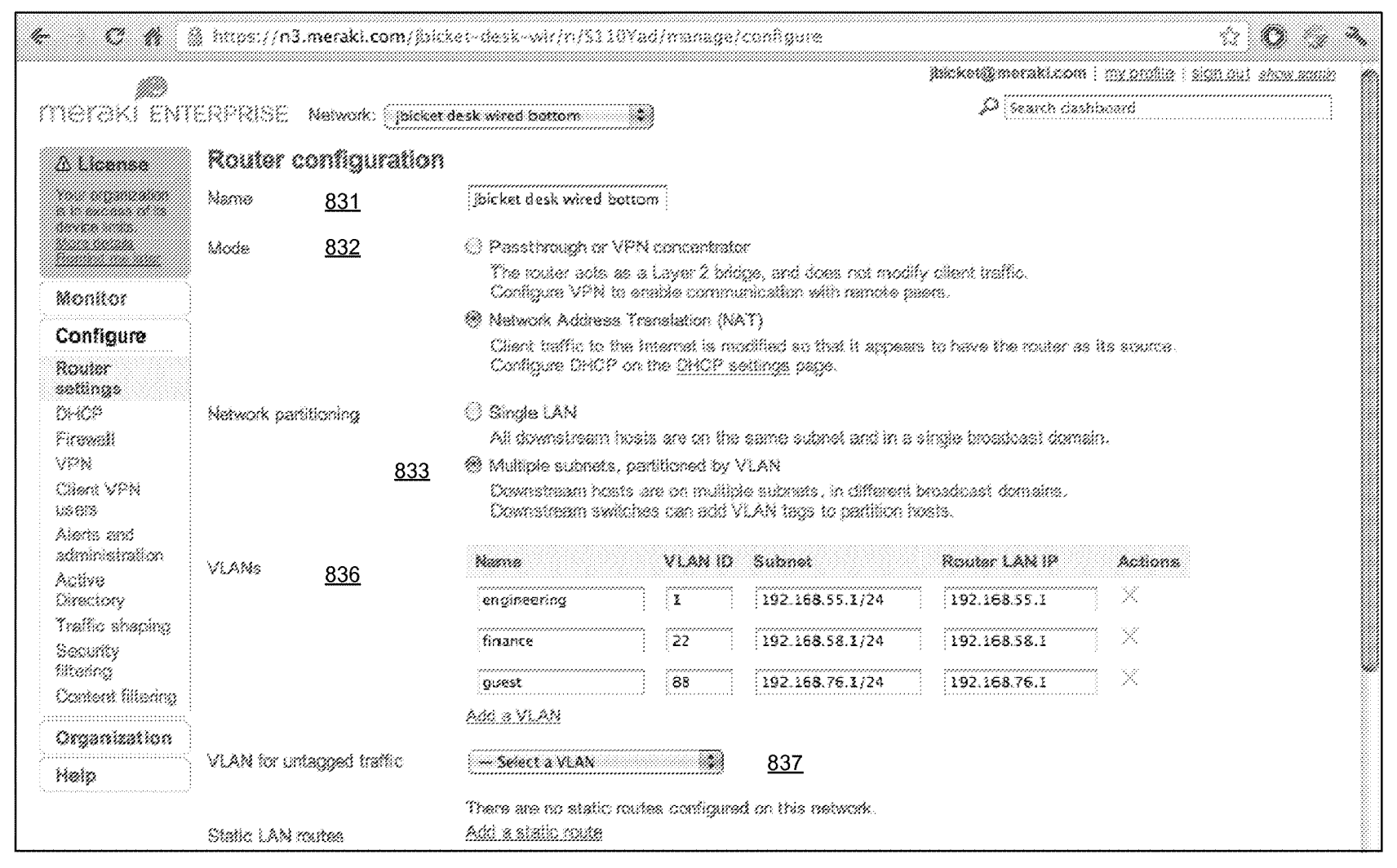

Alternatively, multiple subnets can also be partitioned, as shown in FIG. 8D. Referring to FIG. 8D, the user can specify multiple VLANs in field 836. VLANs allow a user to partition the network into different subnets separated at layer 2. Downstream devices are on multiple subnets, in different broadcast domains. The VLAN-based network separation can be an effective tool for isolating different networks and therefore providing an additional layer of security and reliability. In this situation, the router is the default gateway for each VLAN. For each of the VLANs, the user can specify the name, VLAN tag, subnet, and router local IP address. If the subnet and/or router's local IP address are not provided in field 836, such data will be automatically generated in one embodiment of the invention as previously described. The user can also specify a VLAN for the untagged traffic via field 837. This option allows a user to select how the user wants the router to handle any untagged traffic. The user can either assign it to a particular VLAN or choose to drop untagged traffic. The information entered by the administrator is referred to as user input configuration information and based on this information, automatically calculated VPN configuration information is generated by the management server as previously described; they are collectively referred to as the MS configuration information 108. Also, in some embodiments, the VLAN/subnet settings also include a VLAN participation setting for each VLAN that allows a network administrator to select which VLANs are and are not to participate in the VPN (not shown). Note that the GUis as shown in FIGS. 8A-8D are described for the purpose of illustration only. Other layouts or formats of the GUis may also be implemented.

Figure 9:
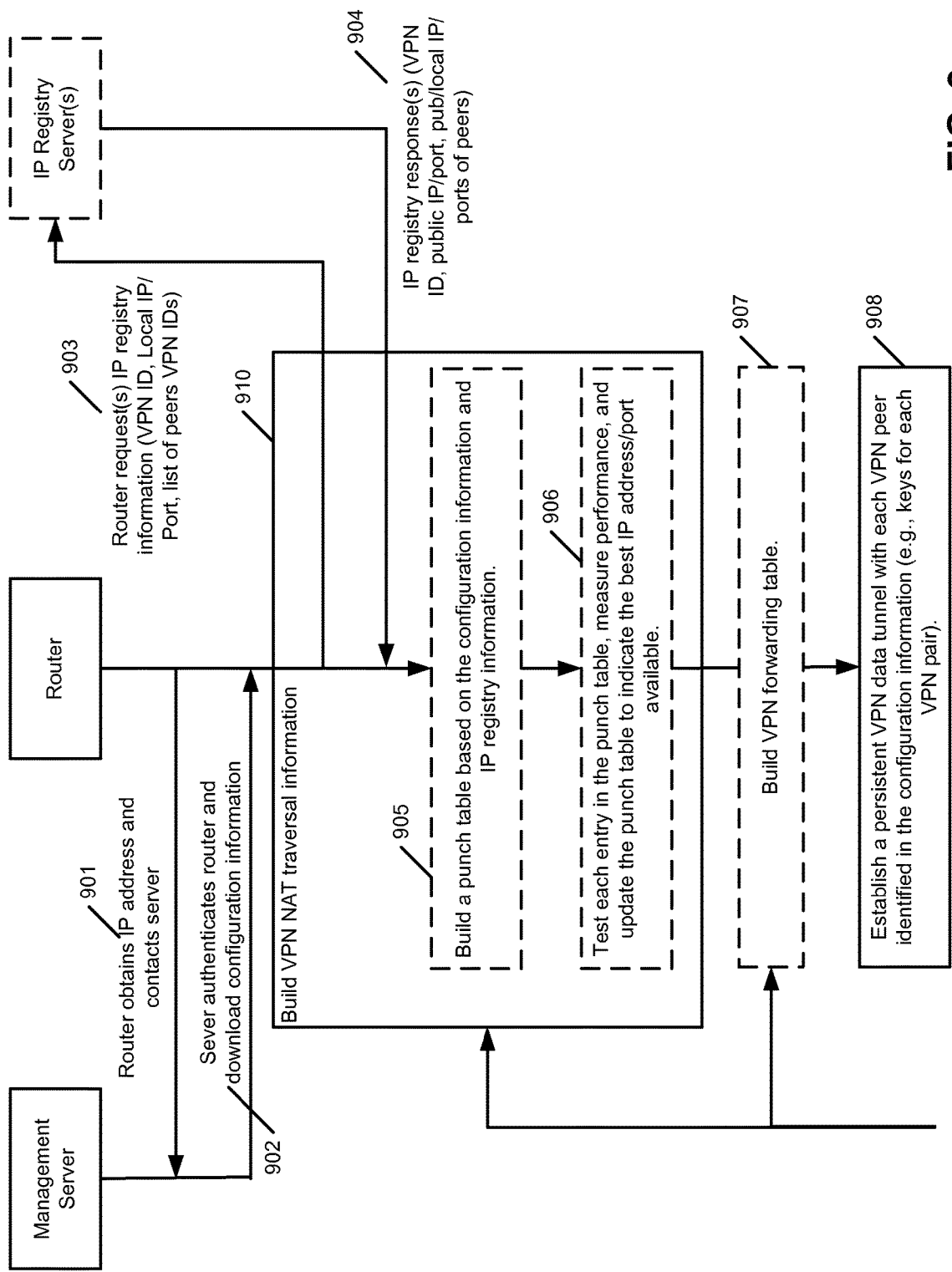
FIG. 9 is a flow diagram illustrating a method to configure a router according to one embodiment of the invention.

FIG. 9 is a flow diagram illustrating a method for configuring a router according to one embodiment of the invention. Referring to FIG. 9, when a router is powered up and coupled to the network, during transaction 901, the router obtains an IP address from a DHCP service provider and contacts the management server based on the IP address of the management server, which may be stored in the router during the manufacturing. While the illustrated embodiment relies on DHCP and has the IP address of the management server already stored, alternative embodiments of the invention allow or require one or both of these addresses to be manually entered. The router may sign a message using a private key stored in the router to allow the management server to authenticate the router. Once the router has been authenticated, during transaction 902, the router downloads the MS configuration information from the management server. The router then builds VPN NAT traversal information in block 910. Block 910 may be performed in different ways by different embodiments (e.g., this information may be manually entered, provided by the MS server). In the embodiment illustrated, block 910 is performed using IP registry server(s). In this embodiment, the router then requests IP registry services from one or more IP registry facilities via transaction 903, where the request includes the VPN ID of the router, local IP address/port of the router, and a list of VPN peers. This information may be downloaded from the management server as part of the MS configuration information. A response is received from one or more IP registry servers via transaction 904. The response includes VPN ID, local and public IP addresses/ports associated with the router, as well as public and local IP addresses for the VPN peers.

At block 905, a punch table is built based on the MS configuration information and the IP registry information. For each entry in the punch table, at block 906, a test is periodically performed, for example, by sending a HELLO or ping message to the corresponding IP address. The performance (e.g., latency) is measured for each test and the punch table is updated to indicate the best IP address/port available. While in the illustrated embodiment, a punch table is used that includes multiple IP address/port combinations for each VPN router and a current best is determined based on testing. An alternative embodiment may be designed to receive only one IP address/port combination for each VPN router and not perform block 906. Optionally, at block 907, a VPN forwarding table is created. Thereafter, at block 908, a persistent VPN data tunnel is created between the router and each of the VPN peers using the corresponding tunnel keys downloaded from the management server. As described later herein, changes to the MS configuration 108 (e.g., a user changing the user input configuration information, which trigger changes to the automatically calculated VPN configuration information) resulted in updates being provided to the affected routers; some embodiments of the invention similarly repeat block 910 to keep the NAT traversal information current (e.g., repeating all of block 910 periodically, repeating block 906 more often than sending new requests to the IP Register Servers).

Figure 10:
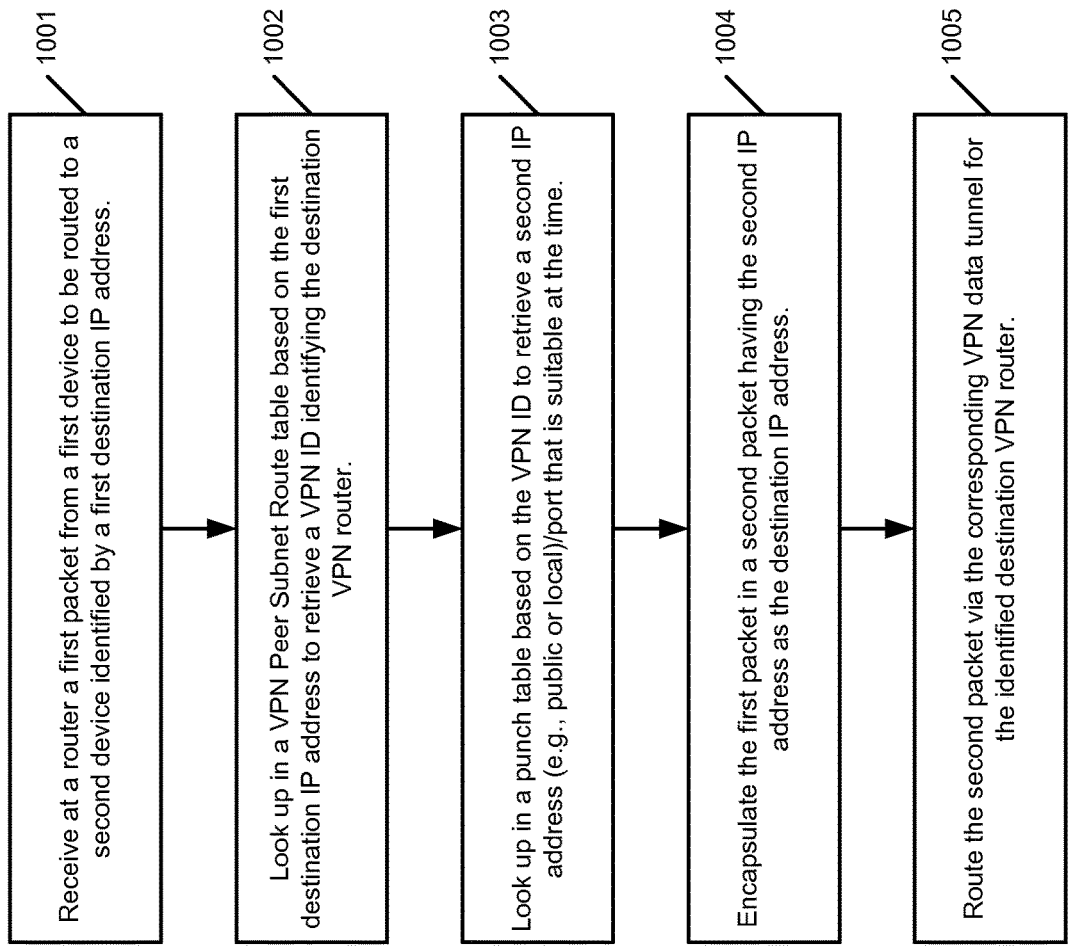
FIG. 10 is a flow diagram illustrating a method for forwarding packets according to one embodiment of the invention.

FIG. 10 is a flow diagram illustrating a method for forwarding packets by a router according to one embodiment of the invention. At block 1001, a router receives a first packet from a first device (e.g., local LAN device) to be routed to a second device (e.g., a remote device) identified by a first destination IP address. At block 1001, the router looks up in a VPN peer subnet route table based on the first destination IP address to retrieve a VPN ID identifying a destination VPN router. At block 1003, the router looks up in a punch table based on the VPN ID to retrieve a second IP address (e.g., public or local IP address) that is suitable at the time. Alternatively, a VPN forwarding data structure as previously described may be utilized instead of looking up in the VPN peer subnet route table and the punch table. At block 1004, the first packet is encapsulated in a second packet having the second IP address as the destination IP address. At block 1005, the second packet is routed to the identified destination VPN router via the corresponding VPN data tunnel.

Figure 11:
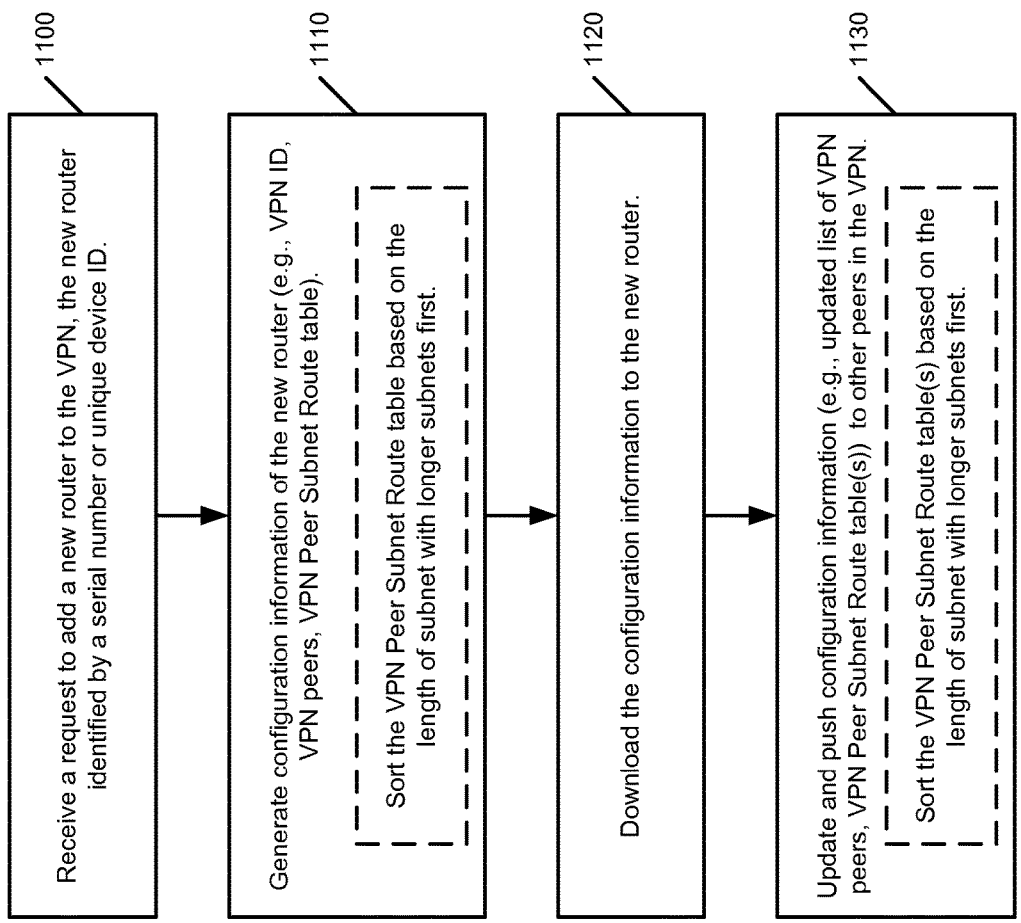
FIGS. 11 and 12 are flow diagrams illustrating methods for updating configuration information according to certain embodiments of the invention.

As described above, when there is a change in network configuration, such as adding or removing a router, change of subnets, the management server automatically reconfigures the necessary settings and the updated MS configuration is provided to the affected routers. FIG. 11 is a flow diagram illustrating a method of updating configuration according to one embodiment of the invention. Referring to FIG. 11, at block 1100, a request to add a new router to the network is received, where the new router is identified by a serial number or unique device ID. At block 1110, configuration information of the new router (e.g., VPN ID, VPN peers, VPN peer subnet route table) is generated. Optionally, the VPN peer subnet route table is sorted based on the length of the subnets with longer subnets first. At block 1120, the configuration information is downloaded to the new router. At block 1130, the management server updates and communicates MS configuration information (e.g., updated list of VPN peers, VPN peer subnet route table(s)) to other peers in the VPN. Optionally, the VPN peer subnet route tables for the VPN peers are sorted based on the length of the subnets.

Figure 12:
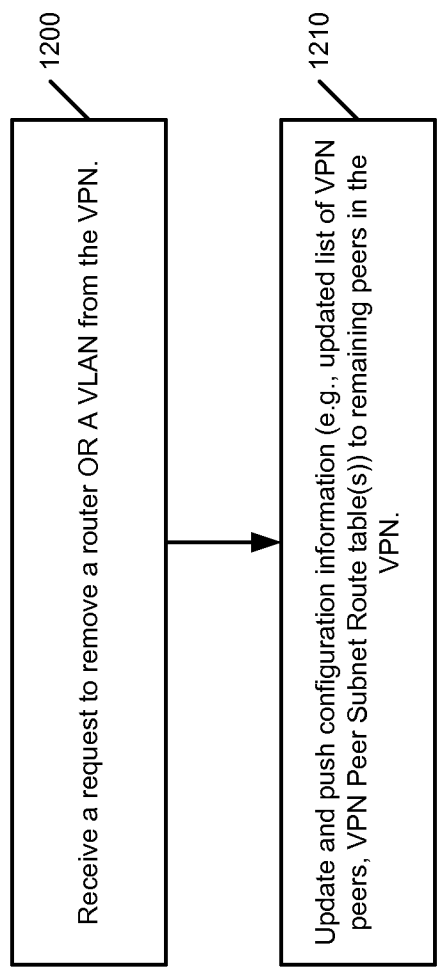

FIG. 12 is a flow diagram illustrating a method of updating configuration according to another embodiment of the invention. Referring to FIG. 12, at block 1200, a request to remove a router or VLAN from the VPN is received at a management server. At block 1210, the management server updates and pushes the configuration information (e.g., updated list of VPN peers, VPN peer subnet route table(s)) to the remaining peers in the VPN.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A method to configure a first router for participation in a virtual private network, the method comprising:
   determining whether the first router is already associated with a virtual local area network (VLAN) based on whether VLAN or subnet settings ("VLAN/subnet settings") of the first router are received from an administrator;
   in response to determining that the first router is not already associated with the VLAN, generating default settings for an untagged VLAN, wherein the default settings include a chosen subnet from the untagged VLAN; and
   generating configuration information for the first router, wherein the configuration information includes a list of VPN peers, tunnel keys for each VPN peer pair, and a VPN peer subnet route table, the VPN peer subnet route table including the chosen subnet for the untagged VLAN;
   wherein the VPN peer subnet route table identifies a plurality of subnets participating in the VPN and a particular router associated with each of the plurality of subnets.

2. The method of claim 1, further comprising:
   providing a graphical user interface (GUI) over a wide area network (WAN) to enter configurations settings for the first router, wherein the configuration settings include the VLAN and a user specified subnet.

3. The method of claim 2, further comprising:
   detecting that the user specified subnet does not overlap with one or more subnets previously used; and
   updating the VPN peer subnet route table with the user specified subnet.

4. The method of claim 1, further comprising:
   sending the list of VPN peers and the VPN subnet route table to a plurality of routers participating in the VPN, wherein the list of VPN peers and the VPN subnet route table is updated to include the first router.

5. The method of claim 1, further comprising in response to a second request to remove a second router from the VPN:
   removing the second router from the list of VPN peers and the VPN subnet route table; and
   sending the list of VPN peers and the VPN subnet route table to the first router.

6. The method of claim 1, further comprising:
   determining, based on a VPN participating setting, that the first router is authorized to participate in the VPN.

7. The method of claim 1, wherein the default settings include a default LAN address for the first router.

8. A non-transitory computer readable medium storing instructions to configure a first router for participation in a virtual private network, the instructions which when executed cause a system to perform operations comprising:

determining whether the first router is already associated with a virtual local area network (VLAN) based on whether VLAN or subnet settings ("VLAN/subnet settings") of the first router are received from an administrator;

in response to determining that the first router is not already associated with the VLAN, generating default settings for an untagged VLAN, wherein the default settings include a chosen subnet from the untagged VLAN; and generating configuration information for the first router, wherein the configuration information includes a list of VPN peers, tunnel keys for each VPN peer pair, and a VPN peer subnet route table, the VPN peer subnet route table including the chosen subnet for the untagged VLAN;

wherein the VPN peer subnet route table identifies a plurality of subnets participating in the VPN and a particular router associated with each of the plurality of subnets.

9. The computer readable medium of claim 8, further comprising:

providing a graphical user interface (GUI) over a wide area network (WAN) to enter configurations settings for the first router, wherein the configuration settings include the VLAN and a user specified subnet.

10. The computer readable medium of claim 9, the operations further comprising:

detecting that the user specified subnet does not overlap with one or more subnets previously used; and updating the VPN peer subnet route table with the user specified subnet.

11. The computer readable medium of claim 8, the operations further comprising:

sending the list of VPN peers and the VPN subnet route table to a plurality of routers participating in the VPN, wherein the list of VPN peers and the VPN subnet route table is updated to include the first router.

12. The computer readable medium of claim 8, the operations further comprising in response to a second request to remove a second router from the VPN:

removing the second router from the list of VPN peers and the VPN subnet route table; and sending the list of VPN peers and the VPN subnet route table to the first router.

13. The computer readable medium of claim 8, the operations further comprising:

determining, based on a VPN participating setting, that the first router is authorized to participate in the VPN.

14. The computer readable medium of claim 8, wherein the default settings include a default LAN address for the first router.

15. A system for configure a first router for participation in a virtual private network, the system comprising:

a processor;

a non-transitory computer readable memory storing instructions which when executed by the processor cause a system to perform operations comprising:

determining whether the first router is already associated with a virtual local area network (VLAN) based on whether VLAN or subnet settings ("VLAN/subnet settings") of the first router are received from an administrator;

in response to determining that the first router is not already associated with the VLAN, generating default settings for an untagged VLAN, wherein the default settings include a chosen subnet from the untagged VLAN; and generating configuration information for the first router, wherein the configuration information includes a list of VPN peers, tunnel keys for each VPN peer pair, and a VPN peer subnet route table, the VPN peer subnet route table including the chosen subnet for the untagged VLAN;

wherein the VPN peer subnet route table identifies a plurality of subnets participating in the VPN and a particular router associated with each of the plurality of subnets.

16. The system of claim 15, further comprising:

providing a graphical user interface (GUI) over a wide area network (WAN) to enter configurations settings for the first router, wherein the configuration settings include the VLAN and a user specified subnet.

17. The system of claim 16, the operations further comprising:

detecting that the user specified subnet does not overlap with one or more subnets previously used; and updating the VPN peer subnet route table with the user specified subnet.

18. The system of claim 15, the operations further comprising:

sending the list of VPN peers and the VPN subnet route table to a plurality of routers participating in the VPN, wherein the list of VPN peers and the VPN subnet route table is updated to include the first router.

19. The system of claim 15, the operations further comprising in response to a second request to remove a second router from the VPN:

removing the second router from the list of VPN peers and the VPN subnet route table; and sending the list of VPN peers and the VPN subnet route table to the first router.

20. The system of claim 15, the operations further comprising:

determining, based on a VPN participating setting, that the first router is authorized to participate in the VPN.

* * * * *